(12) United States Patent
Ishida et al.

(10) Patent No.: US 7,920,305 B2
(45) Date of Patent: Apr. 5, 2011

(54) OPTICAL SCANNING DEVICE, OPTICAL SCANNING METHOD, COMPUTER PROGRAM PRODUCT FOR EXECUTING OPTICAL SCANNING METHOD, RECORDING MEDIUM WITH COMPUTER PROGRAM RECORDED THEREON, IMAGE FORMING APPARATUS, AND COLOR IMAGE FORMING APPARATUS USING THE SAME

(75) Inventors: Masaaki Ishida, Yokohama (JP);
Yasuhiro Nihei, Yokohama (JP);
Atsufumi Omori, Chigasaki (JP); Jun Tanabe, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 907 days.

(21) Appl. No.: 11/882,691

(22) Filed: Aug. 3, 2007

(65) Prior Publication Data
US 2008/0088893 A1 Apr. 17, 2008

(30) Foreign Application Priority Data

Aug. 4, 2006 (JP) ................................. 2006-213445

(51) Int. Cl.
*H04N 1/04* (2006.01)
(52) U.S. Cl. ......... 358/481; 358/509; 358/475; 358/474
(58) Field of Classification Search .................. 358/481, 358/509, 475, 474, 471, 494
See application file for complete search history.

(56) References Cited

U.S. PATENT DOCUMENTS

| | | | |
|---|---|---|---|
| 6,791,596 B2 | 9/2004 | Nihei et al. | |
| 6,927,789 B2 | 8/2005 | Ozasa et al. | |
| 6,933,957 B2 * | 8/2005 | Omori et al. | 347/249 |
| 7,212,224 B2 * | 5/2007 | Nihei et al. | 347/235 |
| 7,256,815 B2 * | 8/2007 | Suzuki et al. | 347/249 |
| 2003/0067533 A1 | 4/2003 | Omori et al. | |
| 2003/0156184 A1 | 8/2003 | Suzuki et al. | |
| 2004/0036762 A1 | 2/2004 | Nihei et al. | |
| 2005/0089069 A1 | 4/2005 | Ozasa et al. | |
| 2005/0146596 A1 | 7/2005 | Nihei et al. | |
| 2005/0219354 A1 | 10/2005 | Omori et al. | |
| 2005/0243163 A1 | 11/2005 | Ozasa et al. | |
| 2006/0209170 A1 | 9/2006 | Nihei | |
| 2006/0285186 A1 | 12/2006 | Ishida et al. | |
| 2007/0030548 A1 | 2/2007 | Nihei et al. | |
| 2007/0091163 A1 | 4/2007 | Omori et al. | |
| 2007/0132828 A1 | 6/2007 | Ishida et al. | |

FOREIGN PATENT DOCUMENTS

| | | |
|---|---|---|
| JP | 2001-272615 A | 10/2001 |
| JP | 2001-350111 A | 12/2001 |
| JP | 2003-072135 A | 3/2003 |
| JP | 3644923 | 2/2005 |

\* cited by examiner

*Primary Examiner* — Houshang Safaipour
(74) *Attorney, Agent, or Firm* — Dickstein Shapiro LLP

(57) ABSTRACT

An optical scanning device of the invention includes: n-odd (n≧2) light sources disposed at different positions at least in a sub scanning direction; a light source driving control part configured to control a light emitting state of the light source; and a sub-scanning pixel position detecting part configured to depict one pixel with m-odd (n≧m≧2) light sources of the n-odd (n≧2) light sources and to detect a deviation in position of the one pixel in a sub scanning direction, wherein the light source driving control part is configured to correct the deviation in position of the one pixel in the sub scanning direction at a resolution equal to or higher than a density of the pixel, depicted with the m-odd light sources, by controlling the light emitting state of the m-odd light sources on the basis of a result of detection with the sub-scanning pixel position detecting part.

19 Claims, 31 Drawing Sheets

| CORRECTION DATA | CONTROL PATTERN | LIGHT SOURCE A | LIGHT SOURCE B | CORRESPONDING PIXEL(FIG.4) |
|---|---|---|---|---|
| (000) | CONTROL PATTERN 1 | IMAGE DATA 0 | IMAGE DATA 8 | PIXEL 1 |
| (001) | CONTROL PATTERN 2 | IMAGE DATA 2 | IMAGE DATA 6 | PIXEL 2 |
| (010) | CONTROL PATTERN 3 | IMAGE DATA 3 | IMAGE DATA 5 | PIXEL 3 |
| (011) | CONTROL PATTERN 4 | IMAGE DATA 4 | IMAGE DATA 4 | PIXEL 4 |
| (100) | CONTROL PATTERN 5 | IMAGE DATA 5 | IMAGE DATA 3 | PIXEL 5 |
| (101) | CONTROL PATTERN 6 | IMAGE DATA 6 | IMAGE DATA 2 | PIXEL 6 |
| (110) | CONTROL PATTERN 7 | IMAGE DATA 8 | IMAGE DATA 0 | PIXEL 7 |

FIG.10

RECORDING PAPER

| ADDRESS | CLOCK COUNT VALUE |
|---|---|
| L | 5,4,4,6,5,6 |
| L+1 | 3,5,5,7,4,6 |
| L+2 | ... |
| L+3 | ... |

EXAMPLE OF LUT

FIG.36

OPTICAL SCANNING DEVICE, OPTICAL SCANNING METHOD, COMPUTER PROGRAM PRODUCT FOR EXECUTING OPTICAL SCANNING METHOD, RECORDING MEDIUM WITH COMPUTER PROGRAM RECORDED THEREON, IMAGE FORMING APPARATUS, AND COLOR IMAGE FORMING APPARATUS USING THE SAME

PRIORITY CLAIM

The present application is based on and claims priority from Japanese Patent Application No. 2006-213445, filed on Aug. 4, 2006, the disclosure of which is hereby incorporated by reference in its entirety.

BACKGROUND

The present invention relates to an optical scanning device, an optical scanning method, a computer program product for executing the optical scanning method, a recording medium with a computer program recorded thereon, an image forming apparatus, and a color image forming apparatus using the same.

FIG. 29 illustrates an example of the structure of an image forming apparatus of a general type, such as a laser printer utilizing an electro-photography process, a digital copier, and so on.

Referring to FIG. 29, laser beams emitted from a semiconductor laser unit 1001 acting as a light source unit are deflection-scanned with a rotating polygon mirror 1002 and irradiated onto a photosensitive member 1004 to be scanned through a scanning lens (fθ lens) 1003.

The photosensitive member 1004 is exposed to laser beams and an electrostatic latent image is formed on the surface of the photosensitive member 1004.

A phase synchronizing circuit 1009 forms an image clock (pixel clock) synchronizing with an output signal of a photodetector 1005 detecting the position of a scanning line and sends the image clock to an image processing unit 1006 and a laser driving circuit 1007.

The image processing unit 1006 and the laser driving circuit 1007 are controlled in synchronization with the image clock to control a light emitting time of the semiconductor laser beams.

This control allows formation of the electrostatic latent image of the image data formed with the image processing unit 1006 at an appropriate position on the surface of the photosensitive member 1004.

Recently, there have been increasing demands for speeding-up a printing speed (i.e., forming an image at a high speed) and enhancing an image quality.

In order to meet such demands, the speeding-up of the polygon motor working as a deflector and the image clock working as a reference clock for a laser modulation have been achieved.

The efforts for speeding-up, both of these means, however, have been approaching to the limits, and a further speeding-up of these means is being confronted with a severe situation.

Therefore, the speeding-up has been attempted by adopting multi-beams using plural light sources.

An optical scanning method using multi-beams can decrease a rotating speed of the polygon motor working as the deflector and frequency of the image clock due to an increased number of light fluxes capable of being scanned simultaneously with the deflector, thereby achieving a high-speed and stable optical scanning and image forming.

As the light sources for emitting such multi-beams, there may be used a combination of plural laser chips of single beams, an LD array with plural light emitting diodes incorporated into a laser chip, and so on.

Since a semiconductor laser to be used for the LD array or the like is extremely compact in size and can be modulated directly with driving electric current at a high speed, it has recently been used widely as a light source for laser printers and so on.

As the driving electric current and light output of the semiconductor laser have the characteristic of being varied with temperature, however, the semiconductor laser has the problem that the light output be varied with the heat emitted from the semiconductor laser itself.

In particular, a vertical-cavity surface-emitting laser with plural light sources disposed on an identical chip is likely to be affected by a variation in temperature or temperature crosstalk, etc., by light emission or extinction because a distance between the light sources is short.

This may likely cause changing a quantity of light.

In order to compete with this problem, for example, Japanese Patent Publication No. 2001-272615 discloses an optical scanning device with plural light sources disposed in a two-dimensional way for optically scanning a medium by deflecting plural light fluxes, in which a density of disposition of light emitting points is made maximum without causing an occurrence of any crosstalk by heat generation among the light emitting points.

Japanese Patent Publication No. 2003-72135 discloses an image forming apparatus using a vertical-cavity surface-emitting laser, which is provided with a driving part capable of varying a light emitting intensity of each chip at a pixel unit and a control part for controlling a light emitting time and forms an electrostatic latent image of pixels while avoiding a deterioration in the light emitting properties of the laser array caused by heat generation by controlling the light emitting time.

Japanese Patent Publication No. 2001-350111 discloses a multi-beam scanning device using a vertical-cavity surface-emitting laser, which can avoid the problem with crosstalk caused by heat generation among light emitting points by way of a defined arrangement of the light sources and realize the recording of images at a high density.

In general, conventional optical scanning devices having plural light sources as described above have the problem that a deviation in a light emitting level of each light source directly affects an adverse influence on a variation in brightness (or concentration) of pixels because one pixel is drawn by one light source. In particular, they have the problem that such a variation in brightness (or concentration) of pixels located in a sub scanning direction which are discontinuous in terms of time cannot be corrected by such conventional systems.

Further, they have the problem that there is no effective way for highly accurately correcting a deviation in position of the scanning line in the sub scanning direction, which may be caused by optical or mechanical factors.

SUMMARY

The present invention is directed to an optical scanning device capable of highly accurately correcting a deviation of position of a scanning line in the sub scanning direction resulting from an optical or mechanical factor, an optical scanning method, a computer program product for executing the optical scanning method, a recording medium with a computer program recorded thereon, an image forming apparatus, and a color image forming apparatus using the same.

To achieve these and other advantages and in accordance with the purpose of the invention, as embodied and broadly described herein, the invention provides an optical scanning device, comprising: n-odd (n≧2) light sources disposed at different positions at least in a sub scanning direction; a light source driving control part configured to control a light emitting state of the light source; and a sub-scanning pixel position detecting part configured to depict one pixel with m-odd (n≧m≧2) light sources of the n-odd (n≧2) light sources and to detect a deviation in position of the one pixel in a sub scanning direction, wherein the light source driving control part is configured to correct the deviation in position of the one pixel in the sub scanning direction at a resolution equal to or higher than a density of the pixel, depicted with the m-odd light sources, by controlling the light emitting state of the m-odd light sources on the basis of a result of detection with the sub-scanning pixel position detecting part.

Advantageously, the light source driving control part is configured to perform the correction at a resolution of an interval between the adjacent light sources extending in the sub scanning direction, by turning on or off the light sources disposed in at least one of a top end and a bottom end of the m-odd light sources disposed along the sub scanning direction.

Advantageously, the light source driving control part is configured to perform the correction at a resolution finer than an interval between the adjacent light sources extending in the sub scanning direction by controlling a light emitting time of the light sources disposed in at least one of a top end and a bottom end of the m-odd light sources disposed along the sub scanning direction.

Advantageously, the light source driving control part is configured to perform the correction at a resolution finer than an interval between the adjacent light sources extending in the sub scanning direction by controlling an exposure area of a photosensitive member to be exposed with the light sources disposed in at least one of a top end and a bottom end of the m-odd light sources disposed along the sub scanning direction.

Advantageously, the light source driving control part is configured to perform the correction at a resolution finer than an interval between the adjacent light sources extending in the sub scanning direction by controlling a surface potential of a photosensitive member to be exposed with the light sources disposed in at least one of a top end and a bottom end of the m-odd light sources disposed along the sub scanning direction.

Advantageously, the position of the pixel which is located in a main scanning direction and for which the correction starts differs in each scanning line, and a number of the correction to be performed for each scanning line is equal to each other.

Advantageously, the position of the pixel which is located in the main scanning direction and for which the correction starts is deviated by a predetermined interval in the adjacent main scanning lines.

Advantageously, the position of the pixel which is located in the main scanning direction and for which the correction starts is set on the basis of a random number.

Advantageously, the position of the pixel which is located in the main scanning direction and for which the correction starts is set in such a manner that only the first position in each scanning line is set on the basis of a random number, and the remaining position or positions following the position in the each scanning line is or are set at a constant cycle.

Advantageously, the position of the pixel which is located in the main scanning direction and for which the correction starts is set in such a manner that only the first position in each scanning line is set to have a different predetermined amount for each scanning line, and the remaining position or positions following the position in the each scanning line is or are set at a constant cycle.

Advantageously, the optical scanning device further comprises a storage part configured to store the position of the pixel which is located in the main scanning direction and for which the correction starts, and wherein the correction is conducted on the basis of the position stored in advance in the storage part.

Advantageously, the optical scanning device further comprises a count value forming hart configured to form a count value that is smaller than a total number of the pixels of the scanning line extending in the main scanning direction and does not coincide with a total number of the pixels located in the main scanning direction when multiplied with an integer, wherein the position of the pixel which is located in the main scanning direction and for which the correction starts is set at an interval of the pixels of the count value and a number of the pixel or pixels lacking from the count value at the terminal end of each scanning line is set at the initial position in the next scanning line.

Advantageously, a main scanning direction is divided by K into sections K, and the correction is conducted for every region corresponding to every section K.

Advantageously, the n-odd light sources include a semiconductor laser.

Advantageously, the n-odd light sources include a vertical-cavity surface-emitting laser.

The invention also provides an image forming apparatus, comprising an optical scanning device including: n-odd (n≧2) light sources disposed at different positions at least in a sub scanning direction; a light source driving control part configured to control a light emitting state of the light source; and a sub-scanning pixel position detecting part configured to depict one pixel with m-odd (n≧m≧2) light sources of the n-odd (n≧2) light sources and to detect a deviation in position of the one pixel in a sub scanning direction, wherein the light source driving control part is configured to correct the deviation in position of the one pixel in the sub scanning direction at a resolution equal to or higher than a density of the pixel, depicted with the m-odd light sources, by controlling the light emitting state of the m-odd light sources on the basis of a result of detection with the sub-scanning pixel position detecting part.

In addition, the invention provides a color image forming apparatus, comprising an optical scanning device including: n-odd (n≧2) light sources disposed at different positions at least in a sub scanning direction; a light source driving control part configured to control a light emitting state of the light source; and a sub-scanning pixel position detecting part configured to depict one pixel with m-odd (n≧m≧2) light sources of the n-odd (n≧2) light sources and to detect a deviation in position of the one pixel in a sub scanning direction, wherein the light source driving control part is configured to correct the deviation in position of the one pixel in the sub scanning direction at a resolution equal to or higher than a density of the pixel, depicted with the m-odd light sources, by controlling the light emitting state of the m-odd light sources on the basis of a result of detection with the sub-scanning pixel position detecting part.

Furthermore, the invention provides an optical scanning method for controlling scanning of n-odd (n≧2) light sources disposed at different positions at least in a sub scanning direction, the method comprising: depicting one pixel with m-odd (n≧m≧2) light sources of the n-odd light sources; detecting a deviation in position of the one pixel located in the sub scanning direction; and correcting the deviation in position of the one pixel in the sub scanning direction at a resolution equal to or higher than a density of the pixel, depicted with the m-odd light sources, by controlling the light emitting state of the m-odd light sources on the basis of the deviation in position detected.

Moreover, the invention provides a computer program product for controlling scanning, of n-odd (n≧2) light sources disposed at different positions at least in a sub scanning direction, the computer program product comprising: depicting one pixel with m-odd (n≧m≧2) light sources of the n-odd light sources; detecting a deviation in position of the one pixel located in the sub scanning direction; and correcting the deviation in position of the one pixel in the sub scanning direction at a resolution equal to or higher than a density of the pixel, depicted with the m-odd light sources, by controlling the light emitting state of the m-odd light sources on the basis of the deviation in position detected.

In addition, the invention provides a computer-readable recording medium having store thereon a computer program for controlling scanning of n-odd (n≧2) light sources disposed at different positions at least in a sub scanning direction, the computer program executable to perform: depicting one pixel with m-odd (n≧m≧2) light sources of the n-odd light sources; detecting a deviation in position of the one pixel located in the sub scanning direction; and correcting the deviation in position of the one pixel in the sub scanning direction at a resolution equal to or higher than a density of the pixel, depicted with the m-odd light sources, by controlling the light emitting state of the m-odd light sources on the basis of the deviation in position detected.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is a schematic representation for explaining another example of operations for the control of a light source driving control part.

FIG. 36 is an illustration illustrating an example of a LUT (lookup table) indicating the position of the pixel for which the correction starts.

DETAILED DESCRIPTION

Figure 1:
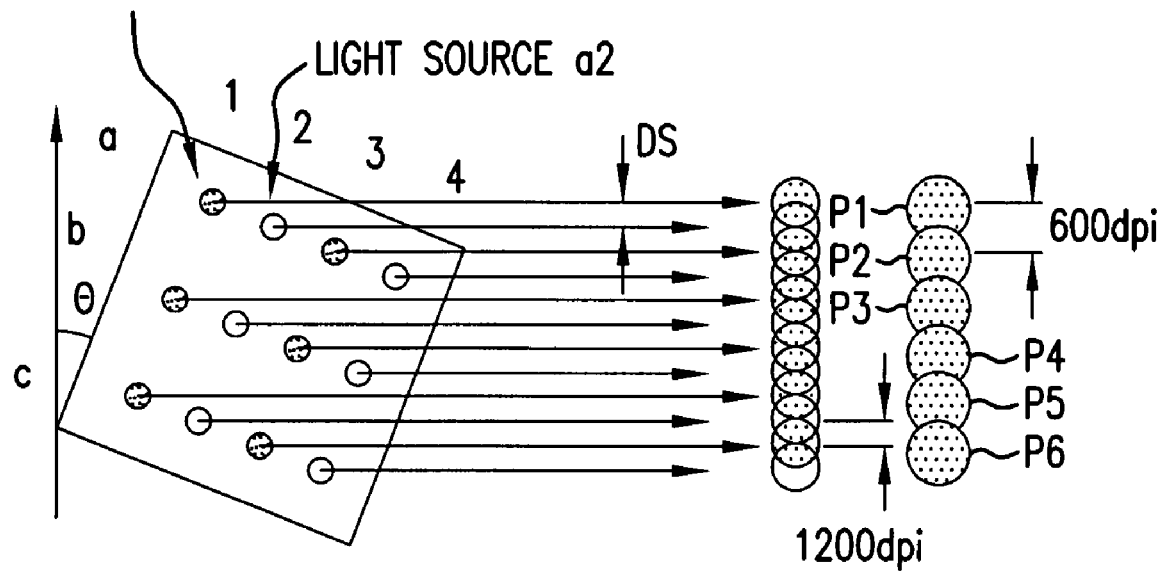
FIG. 1 illustrates an example of a light source unit according to an embodiment of the present invention.

Reference will now be made in detail to the present preferred embodiments of the invention, examples of which are illustrated in the accompanying drawings.

Wherever possible, the same reference numbers are used in the drawings and the description to refer to the same or like parts.

The scope of the present invention, however, is not limited to these embodiments.

Within the scope of the present invention, any structure and material described below can be appropriately modified.

It is to be understood herein that one pixel is intended to genuinely mean one picture element (for example, a picture element of 1,200 dpi being a pixel of approximately 2 μm square).

It is further noted herein that it is not intended to mean a pixel formed by synthesizing plural pixels (for example, 4×4 pixels), such as a dither matrix.

In accordance with the present embodiment of the invention, the terms "n-odd light sources disposed at least at different positions in the sub scanning direction" are intended to mean the n-odd light sources disposed simply in a row in the sub scanning direction as well as in a manner, for instance, as illustrated in FIG. 1.

First Embodiment

A first embodiment according to the present invention relates to a pixel forming apparatus, wherein one pixel is formed by m-odd light sources (n≧m≧2) out of the n-odd light sources (n≧2) disposed at least at different positions in the sub scanning direction.

The first embodiment of the present invention will be described in detail by way of the pixel forming apparatus according to the first embodiment.

Figure 29:
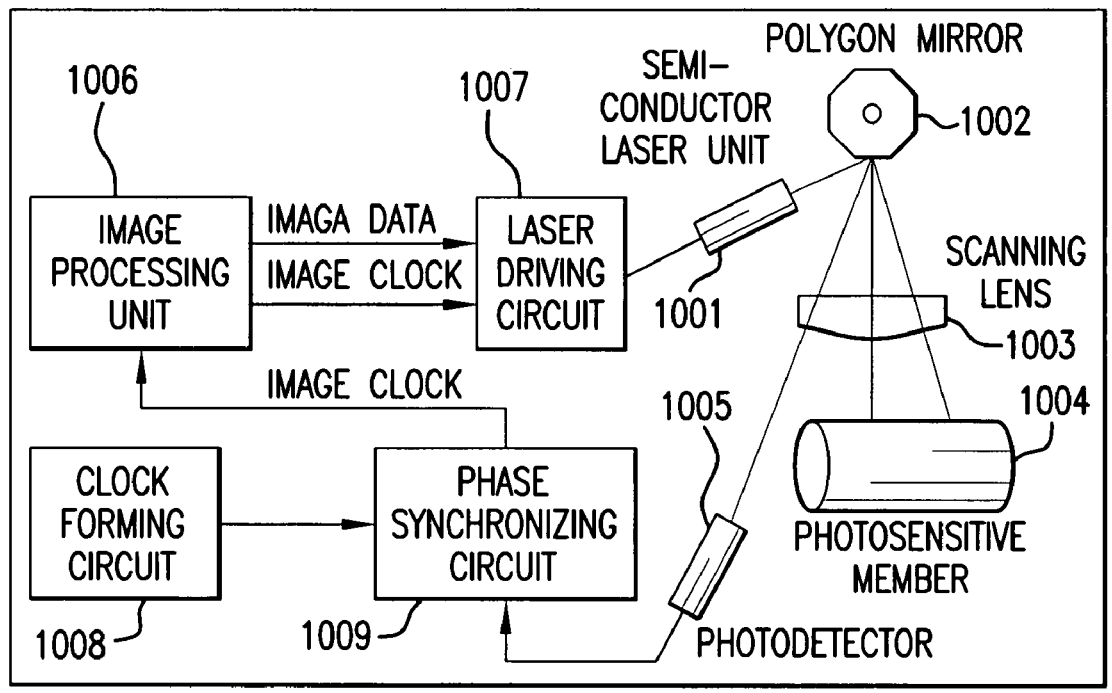
FIG. 29 is a diagram illustrating an example of the structure of a general image forming apparatus.

In the first embodiment of the present invention, the image forming apparatus of a general type as illustrated in FIG. 29 uses a light source unit 1001 as illustrated in FIG. 1 as a semiconductor laser unit 1001. As illustrated in FIG. 1, the light source unit 1001 includes a semiconductor laser array in which plural light sources (plural semiconductor lasers) are disposed in a lattice-like arrangement or a vertical-cavity surface-emitting laser array in which plural light sources (vertical-cavity surface-emitting lasers: VCSEL) are disposed in a lattice-like arrangement.

In this arrangement, the light source unit 1001 is disposed in such a manner that the plural light sources are disposed in a direction at an angle θ with respect to the rotating axis of a deflector (a polygon mirror of FIG. 29).

In the first embodiment, as illustrated in FIG. 1, the light sources disposed in the longitudinal direction are provided, respectively, with symbols "a", "b" and "c", and the light sources disposed in the lateral direction are provided, respectively, with numerals 1 to 4, inclusive.

For example, the light source at the upper left side of FIG. 1 is referred to as symbol "a1".

As the light source unit 1001 is disposed at angle θ, light source a1 and light source a2 expose different positions.

A description will now be made regarding the case where one pixel is formed with two light sources.

For example, in the case where two light sources a1 and a2 as well as two light sources a3 and a4 form each one pixel, as illustrated in FIG. 1, the light sources a1 to a4, inclusive, form pixels Pi (where i=1 to 6) as illustrated at the right end of FIG. 1.

In the event that, as illustrated in FIG. 1, the longitudinal direction is referred to as a sub scanning direction and the distance between the centers of the adjacent pixels Pi is set to 600 dpi, the interval of the centers of the two light sources forming one pixel is set to 1,200 dpi and the density of the light sources, with respect to the density of the pixels is doubled.

When one pixel is formed with two light sources, the position of gravity of the pixel is possible to be deviated in the sub scanning direction by changing a ratio of the quantity of light of the two light sources forming one pixel and the position of the pixel is possible to be controlled at high accuracy.

Second Embodiment

Figure 2:
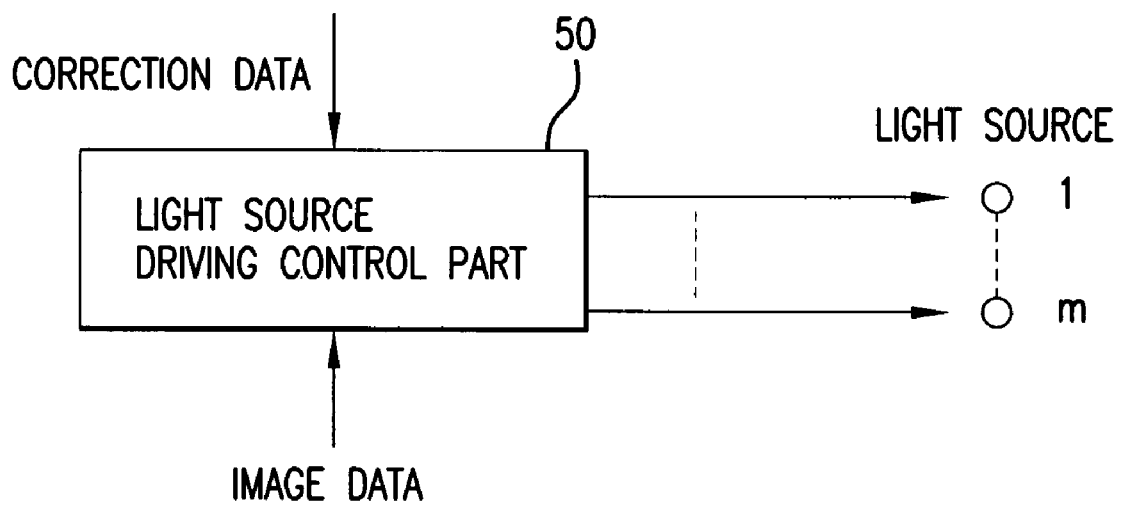
FIG. 2 illustrates an example of an optical scanning device according to a first embodiment of the present invention.

As illustrated in FIG. 2, the optical scanning device according to a second embodiment of the present invention is arranged in such a manner that one pixel is formed by m-odd (n≧m≧2) light sources out of n-odd (n≧2) light sources disposed at least at different positions in the sub scanning direction.

The optical scanning device is provided with a light source driving control part 50 for transferring the gravity of brightness (or concentration) of one pixel in the sub scanning direction by changing the driving states of the light sources in response to correction data for transferring the gravity of the one pixel in the sub scanning direction upon input of the correction data.

Figure 3:
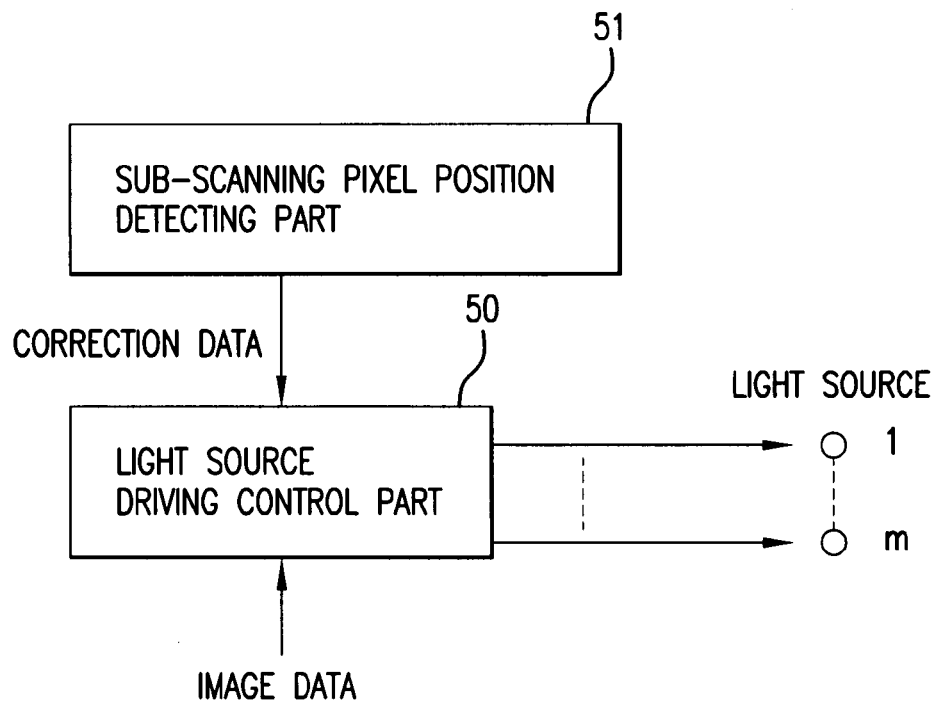
FIG. 3 illustrates an example of an optical scanning device according to the first embodiment of the present invention.

More specifically, as illustrated in FIG. 3, the optical scanning device according to the second embodiment is further provided with a pixel position detecting part 51 for detecting the position of a pixel in the sub scanning direction and outputting the correction data for correcting the position of the pixel in the sub scanning direction by detecting the pixel position in the sub scanning direction.

The light source driving control part 50 transfers the gravity of one pixel in the sub scanning direction by changing the driving states of the m-odd light sources in response to the correction data output from the pixel position detecting part 51.

It is to be noted herein that the technology as disclosed in Japanese Patent No. 3644923, for example can be applied to the pixel position detecting part 51 for detecting the positions of the pixels in the sub scanning direction.

A color forming apparatus as disclosed in Japanese Patent No. 3644923 is provided with plural image forming parts for forming images of colors different from one another on a recording medium by an electro-photographic system, the image forming parts being disposed along the transferring direction (i.e., the sub scanning direction) of a transfer belt for transferring the recording medium; a toner mark forming part for forming a toner mark for detecting the position of each color and recording the toner mark on the transfer belt; at least three sensors for reading the toner marks, arranged at positions including the central portion and both end portions of the transfer belt extending in the primary scanning direction intersecting at right angle through the transfer direction of the transfer belt; and a position deviation amount detecting part for detecting an amount of deviation in the position of each color from a reference color position on the basis of the output of the sensors reading the toner marks.

The position deviation amount detecting part can also be used as the pixel position detecting part 51 for detecting the positions of the pixels in the sub scanning direction according to the embodiment of the present invention.

As described above regarding the image forming apparatus according to the first embodiment, the optical scanning device according to the second embodiment is arranged in such a manner that the m-odd (n≧m≧2) light sources out of the n-odd (n≧2) light sources disposed at least at different positions in the sub scanning direction forms one pixel.

The manner of changing the driving states of the m-odd light sources may include, for example, a manner in which a ratio of light emitting time of each light source is changed to render a total light emitting time or a total exposure time of all the m-odd light sources constant or a ratio of light emitting level (or intensity) of each light source is changed to render a total exposure energy of all the m-odd light sources constant.

FIGS. 4 to 8 are schematic diagrams each for explaining a specific example of a manner for changing the driving states of the m-odd light sources with the light source driving control part 50.

Figure 4:
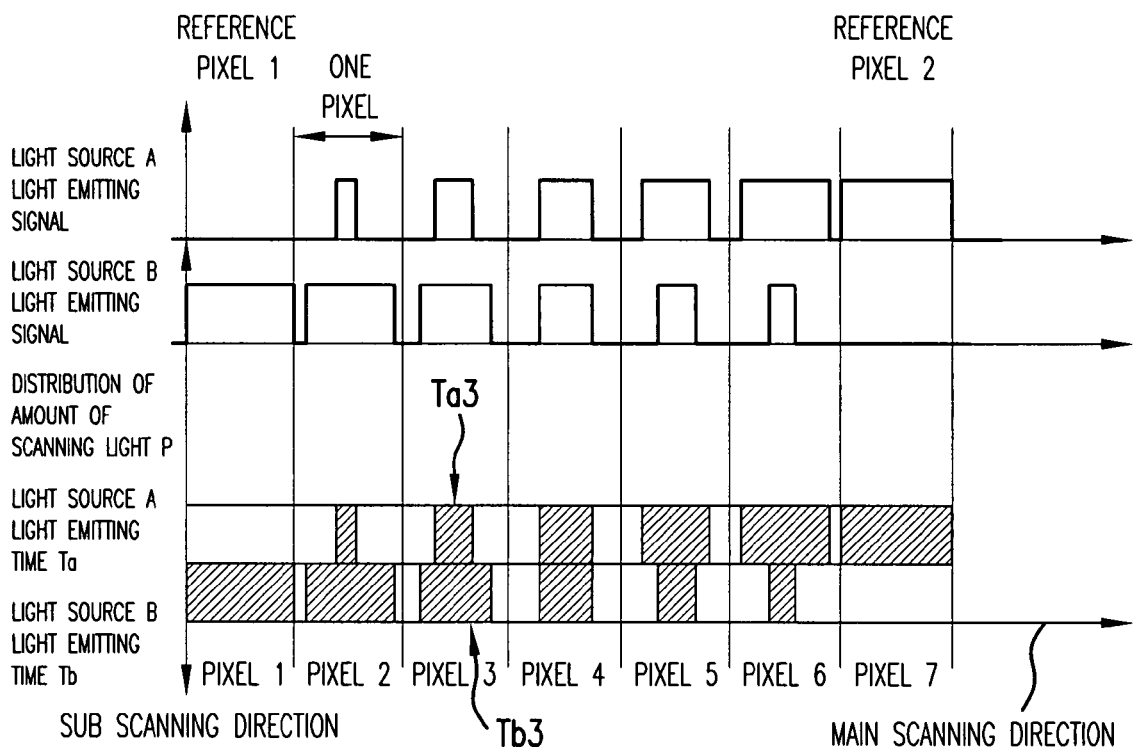
FIG. 4 is a schematic diagram illustrating a specific example of the control for changing the driving states of m-odd light sources according to a second embodiment of the present invention.

FIG. 4 is a schematic diagram describing a specific example in which a ratio of light emitting times of the m-odd light sources is changed to render a total light emitting time of all the m-odd light sources constant in order to transfer the gravity of one pixel in the sub scanning direction.

FIG. 4 illustrates the example where light sources A and B form one pixel.

In FIG. 4, light emitting signals of light sources A and B are illustrated on the upper side thereof and the light emitting times of light sources A and B are illustrated on the lower side thereof.

The case where light sources a1 and a2 of FIG. 1 are referred to as light sources A and B of FIG. 4, respectively, is taken as an example for further explanation. As referred to in FIG. 4, only the light source B turns on for the pixel 1 and the light emitting time of the light source B is set to become gradually shorter as the pixels change from the pixel 1 to pixels 2, 3, . . . , while the light emitting time of light source A is set to become gradually longer.

At pixel 4, the light emitting time of the light source A is set to become equal to that of the light source B.

In the event that the pixel 4 is set as a reference pixel, the light emitting time of the light source A for the pixels 5, 6 and 7 become longer than that of the light source B, thereby deviating the gravity of the pixels in an upward direction with respect to the sub scanning direction as shown in FIG. 4.

On the other hand, the light emitting time of the light source B for the pixels 1, 2 and 3 become longer than that of the light source A, thereby deviating the gravity of the pixels in a downward direction with respect to the sub scanning direction as illustrated in FIG. 4.

The gravity of the pixels is possible to be deviated in the sub scanning direction by changing the ratios of light emitting times of the light sources to render a total light emitting time substantially constant in the manner as described above.

In the event where the pixel 3 is taken as an example by referring to the light emitting time of the light source A as Ta3 and the light emitting time of the light source B as Tb3, the light emitting signals are controlled to render the sum of the light emitting times (Tall=Ta3+Tb3=Tan+Tbn (wherein n is a natural number) constant.

In this case, the deviation in the pixel position in the sub scanning direction is possible to be corrected, for example, by using the technology as disclosed in Japanese Patent No. 3644923, that is, by detecting a deviation in position of a toner image in the sub scanning direction with a sensor, calibrating correction data for correcting the deviation in the position, and changing the ratio of the light emitting time on the basis of the correction data.

Figure 5:
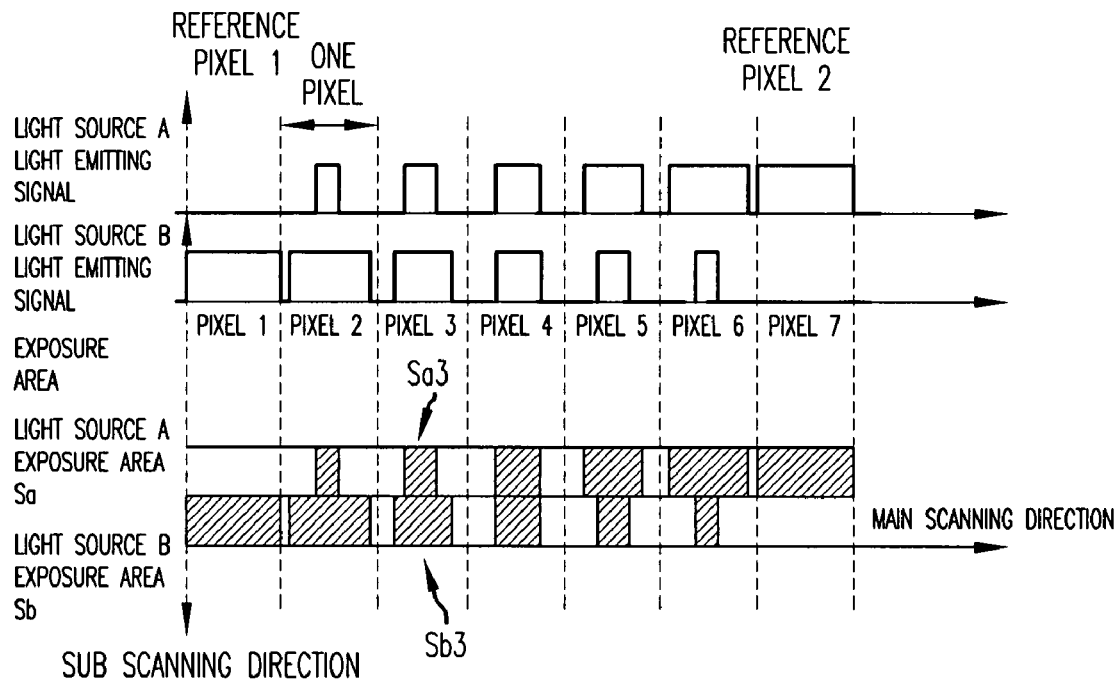
FIG. 5 is a schematic diagram illustrating another specific example of the control for changing the driving states of m-odd light sources according to the second embodiment of the present invention.

FIG. 5 illustrates a specific example where the ratios of light emitting times of the m-odd light sources are varied to render the total exposure area of the m-odd light sources in order to transfer the gravity of one pixel in the sub scanning direction.

In FIG. 5, two light sources A and B are disposed to form one pixel. Light emitting signals of the light sources A and B are illustrated on the upper side of FIG. 5 and the light exposure areas of the light emitting signals of the light sources A and B are illustrated on the lower side of FIG. 5.

Exposure areas on a photosensitive member are varied on the basis of the light emitting signal from each of the light sources A and B.

The case of pixel 3 is taken as an example by referring to the exposure area of the light source A as Sa3 and the exposure area of the light source B as Sb3.

In this case, the light emitting signals are controlled to render the sum of the exposure areas (Sall=Sa3+Sb3=San+ Sbn (wherein n is a natural number)-constant.

This control permits a deviation in gravity of the exposure area (or gravity of pixel) in the sub scanning direction without changing the exposure area per pixel.

Therefore, the deviation in position of the pixel in the sub scanning direction is possible to be corrected by detecting the deviation of position of the toner image in the sub scanning direction with a sensor, calibrating correction data for correcting the deviation of the position of the pixel, and changing a ratio of the exposure areas based on the correction data.

Figure 6:
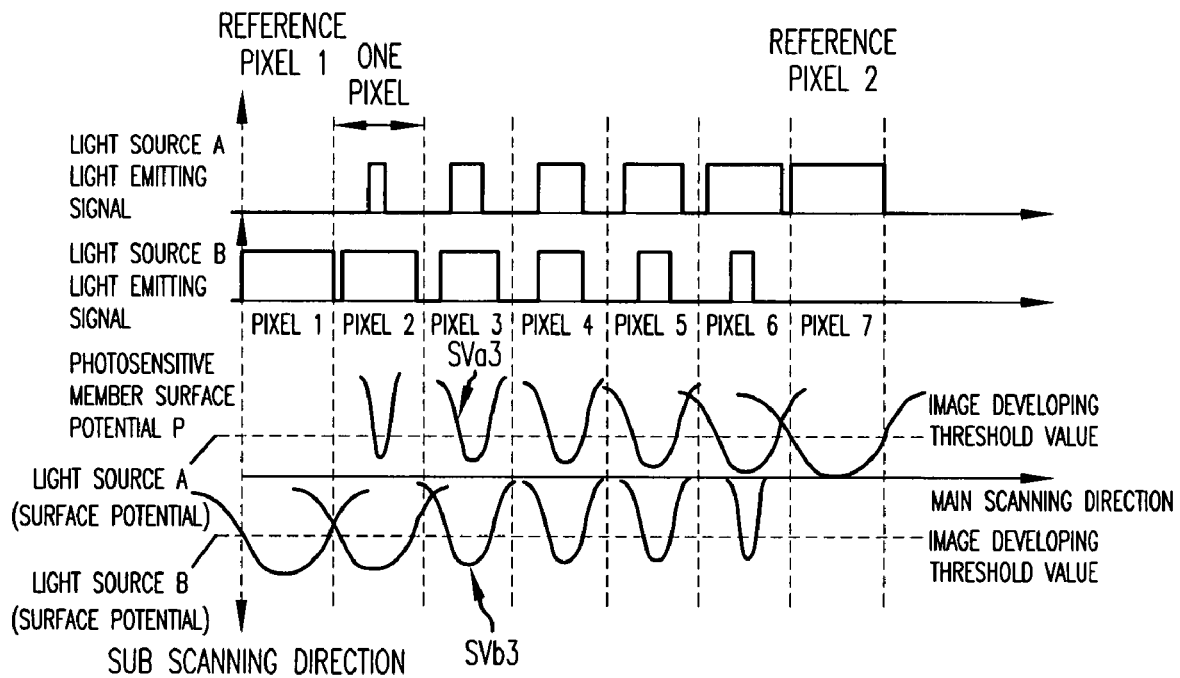
FIG. 6 is a schematic diagram illustrating another specific example of the control for changing the driving states of m-odd light sources according to the second embodiment of the present invention.

FIG. 6 illustrates a specific example in which a ratio of surface potentials of the m-odd light sources is changed to render a total surface potential on the surface of the photosensitive member with the m-odd light sources in order to transfer the gravity of one pixel in the sub scanning direction.

In FIG. 6, the case where one pixel is formed by two light sources A and B is illustrated.

Light emitting signals of the light sources A and B are illustrated on the upper side of FIG. 6 and the surface potentials of the light sources A and B are illustrated on the lower side of FIG. 6.

The pixel is formed on the photosensitive member when the light emitting time and the light emitting level of each of the light sources A and B are changed and when the surface potential exceeds a threshold of development in response to the light emitting time and the light emitting level.

At this time, for example, the light emitting signals from the light sources A and B for pixel 3 are controlled to render the sum of a total surface potential of the surface potential SVa3 of the light source A and the surface potential SVb3 of the light source B (SVall=SVa3+SVb3=SVan+SVbn (wherein n is a natural number)) constant.

This control permits the gravity of distribution of the surface potentials (or a gravity of pixel) to deviate in the sub scanning direction without changing the sum of the surface potentials per pixel.

Therefore, the deviation in position of the pixel in the sub scanning direction is possible to be corrected by detecting a deviation in position of the toner image in the sub scanning direction with a sensor, calibrating correction data for correcting the deviation in position of the pixel, and changing a ratio of the surface potentials on the basis of the correction data.

Figure 7:
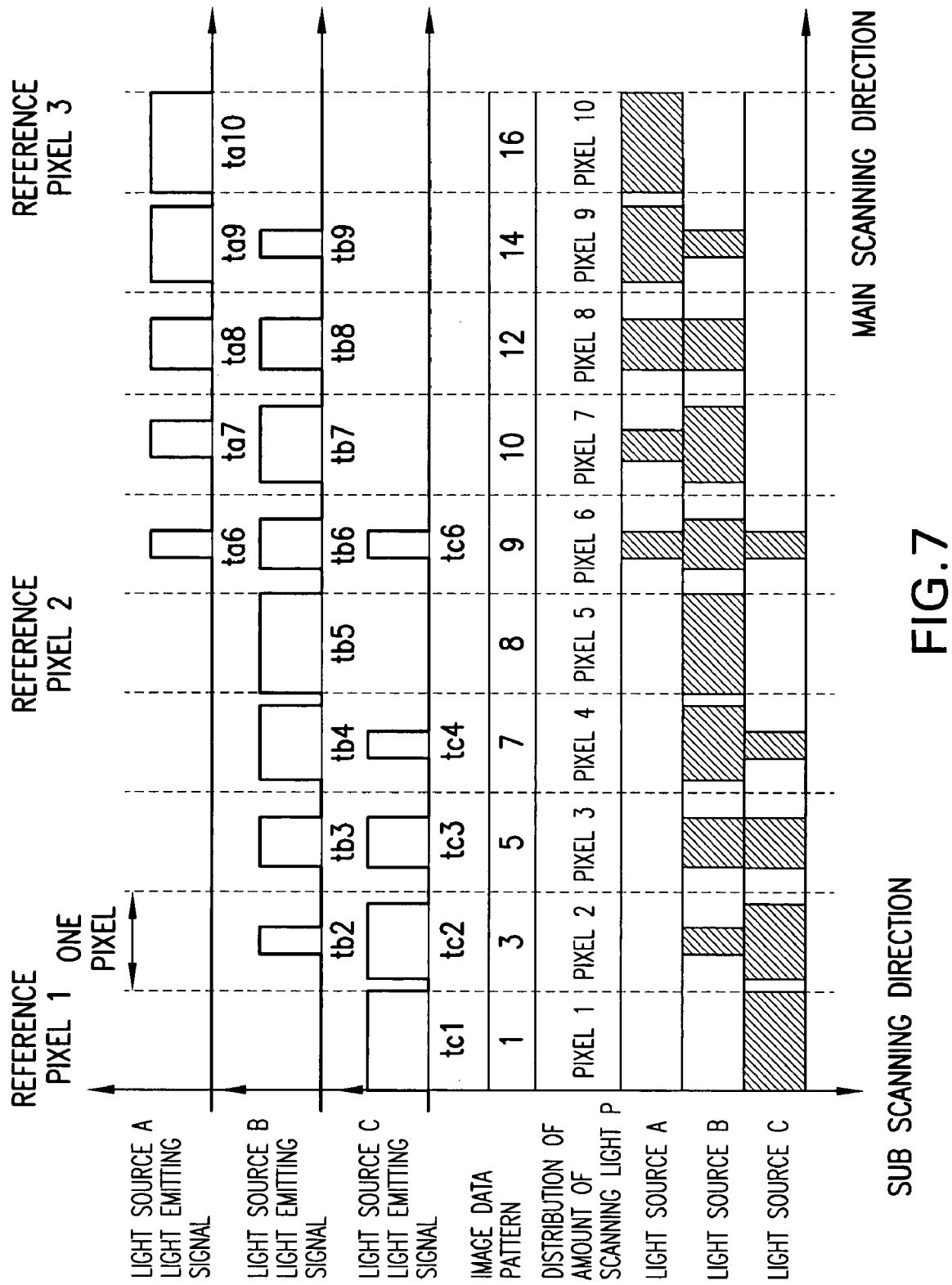
FIG. 7 is a schematic diagram illustrating another specific example of the control for changing the driving states of m-odd light sources according to the second embodiment of the present invention.

FIG. 7 illustrates an example where three light sources are used.

As illustrated in FIG. 7, three light sources A, B and C are disposed to form one pixel.

In the event where the position of the pixel would be deviated in the sub scanning direction, a gravity of the pixel is possible to be deviated in the sub scanning direction by controlling the light emitting signals of the light sources A, B and C in substantially the same manner as the case where the two light sources are used.

Therefore, the deviation in position of the pixel in the sub scanning direction is possible to be corrected by detecting the position of the toner image in the sub scanning direction with a sensor, calibrating correction data for correcting the deviation in the image position, and changing a ratio of the surface potentials on the basis of the correction data.

Figure 8:
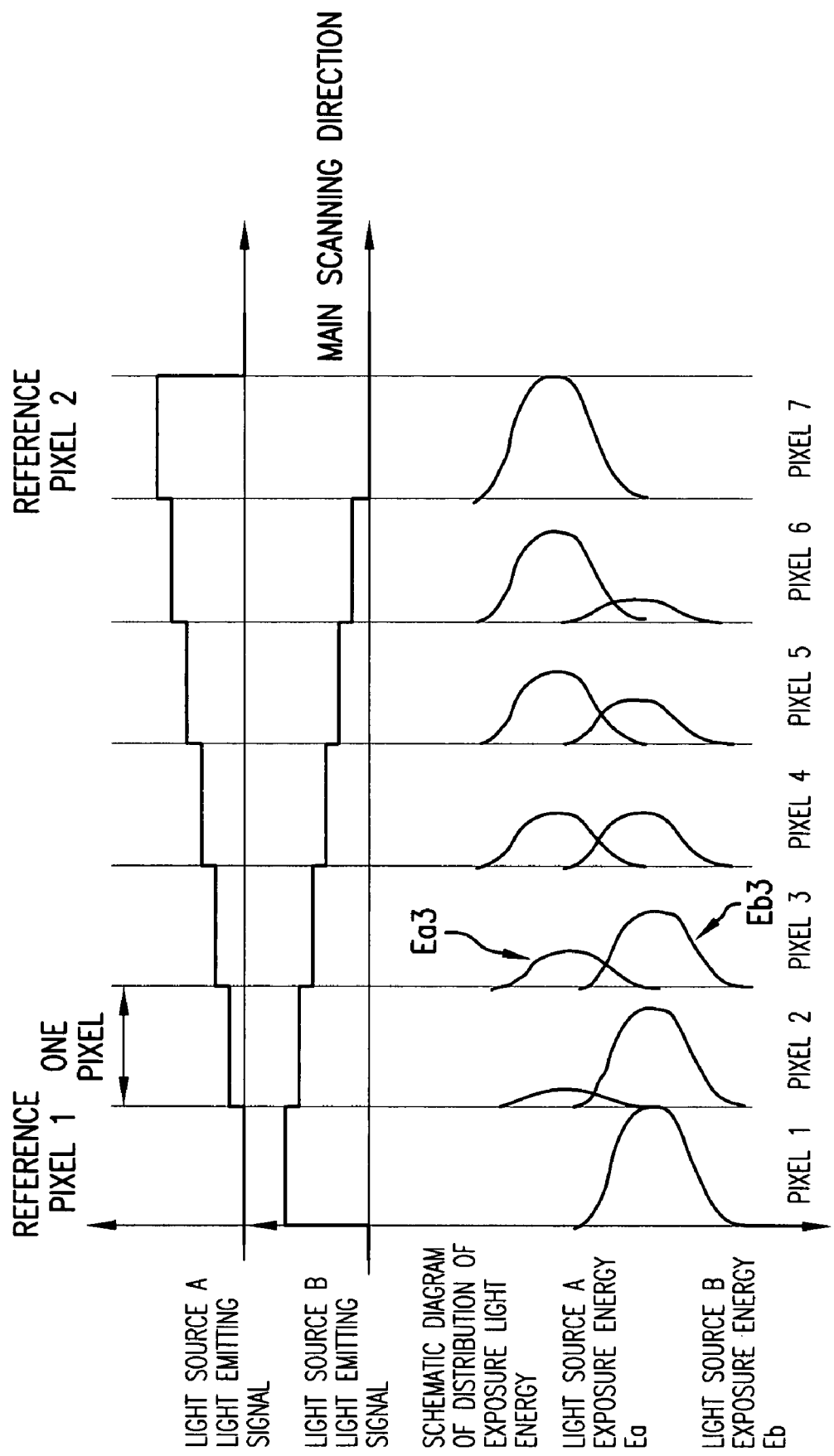
FIG. 8 is a schematic diagram illustrating another specific example of the control for changing the driving states of m-odd light sources according to the second embodiment of the present invention.

FIG. 8 illustrates a specific example in which a ratio of exposure energy of the m-odd light sources is varied to render a total exposure energy of the m-odd light sources constant in order to transfer the gravity of one pixel in the sub scanning direction.

The light emitting signals of the light sources A and B are illustrated on the upper side of FIG. 8 and the exposure energy of the light emitting signals of the light sources A and B is illustrated on the lower side thereof.

The light emitting level (or exposure energy) of each of the light sources A and B is varied on the basis of light emitting signals from the light sources A and B.

A case of pixel 3 is taken as an example by referring to the exposure energy of the light source A as Ea3 and the exposure energy of the light source B as Eb3.

In this case, the light emitting signals are controlled to render the sum of the exposure energies (Eall=Ea3+ Eb3=Ean+Ebn (wherein n is a natural number)).

This control permits a deviation in gravity of the exposure energy (or gravity of the pixel) in the sub scanning direction without changing the exposure energy per pixel.

Therefore, the deviation in position of the pixel in the sub scanning direction is possible to be corrected by detecting a deviation in position of the toner image in the sub scanning direction with a sensor, calibrating correction data for correcting the deviation in the image position, and changing a ratio of the exposure energy (or the light emitting level) on the basis of the correction data.

Figure 9:
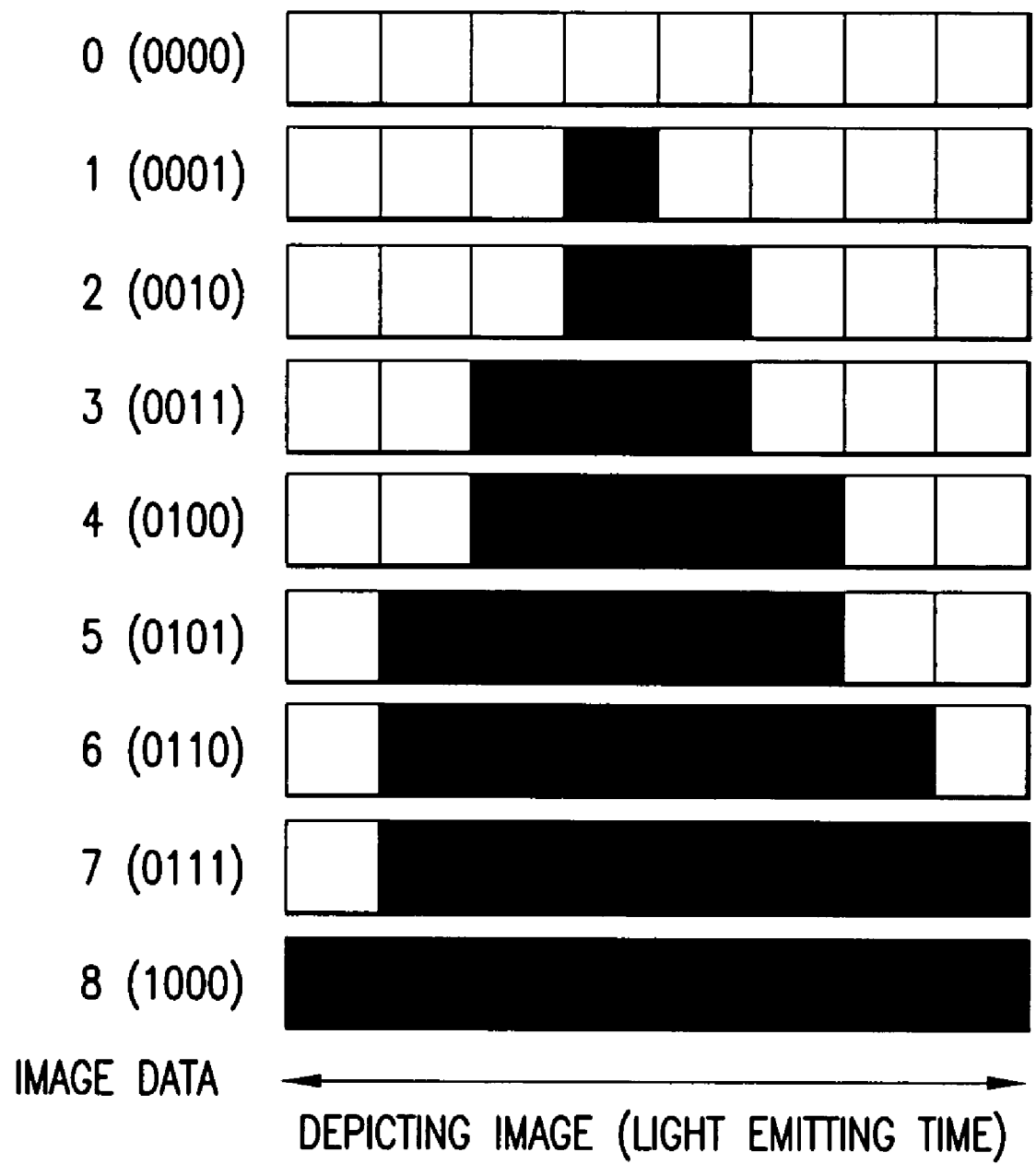
FIG. 9 is a schematic representation for explaining an example of operations for the control of a light source driving control part.

FIGS. 9 and 10 illustrate each a specific example for varying the light emitting time of each of the light sources A and B, or an example of the control of the operation of the light source driving control part 50.

FIG. 9 illustrates the relationship of image data with a depicting image (or light emitting time).

In FIG. 9, one pixel is depicted at a resolution of one eighth of the light emitting, time (i.e., pixel width), required for depicting one pixel.

Therefore, the image data is composed of eight kinds of image data including, for example, image data 1 corresponding to one eighth of the light emitting time image data 2 corresponding to two eighths of the light emitting time, . . . , and image data 8 corresponding to eight eighths of the light emitting time.

For example, image data 1 is the image data corresponding to the one eighth of the light omitting time that is required for forming an image by emitting light from the light source located at the eighth division of the light emitting time from the start of light emission if the light emitting time required for depicting one pixel is divided into eight divisions of the time.

The image data 1 is represented by the four digits (0001) of the binary system.

Likewise, for example, the image data 2 is the image data corresponding to the two eighths of the light emitting time and required for emitting the light source at the third and fourth divisions of the time from the start of light emission.

The image data 2 is represented by the four digits (0010) of the binary system.

FIG. 10 illustrates a table indicating control patterns for controlling the light emitting times of the light sources A and B of FIG. 4 on the basis of the relationship of the image data with the light emitting times (or pattern images) as indicated by FIG. 9.

The longitudinal axis of the table represents control patterns 1 to 7, inclusive, outputting to the light sources A and B, and the control patterns 1 to 7 correspond to pixels 1 to 7 of FIG. 4, respectively.

For example, the control pattern 3 corresponds to the pixel 3 of FIG. 4 and depicts the pixel 3 by sending pixel data 3 (0011) to the light source A and pixel data 5 (0101) to the light source B.

Turning now to the light source driving control part 50, it selects a pattern 1 of FIG. 10 as the correction data (001) is given and likewise selects a pattern 2 of FIG. 10 as the correction data (010) is given.

A pattern 3 of FIG. 1C is selected as the correction data (011) is given, and a pattern 4 of FIG. 10 is selected as the correction data (100) is given.

Patterns 5, 6 and 7 of FIG. 10 are likewise selected as the correction data (101), (110) and (111) are given, respectively.

When the correction data (001), (010), (011), (100), (101), (110) and (111) are given consecutively in this order, the light source driving control part 50 is possible to change the driving states of the light sources A and B in the manner as illustrated in FIG. 4.

By altering the control patterns of the light source driving control part 50, the light emitting times of the light sources A and B are possible to be controlled.

Therefore, the position of gravity of the pixel is possible to be deviated in the sub scanning direction by altering the control pattern of the light source driving control part 50 in accordance with an amount of correction data for correcting the deviation in the pixel position.

Figure 11:
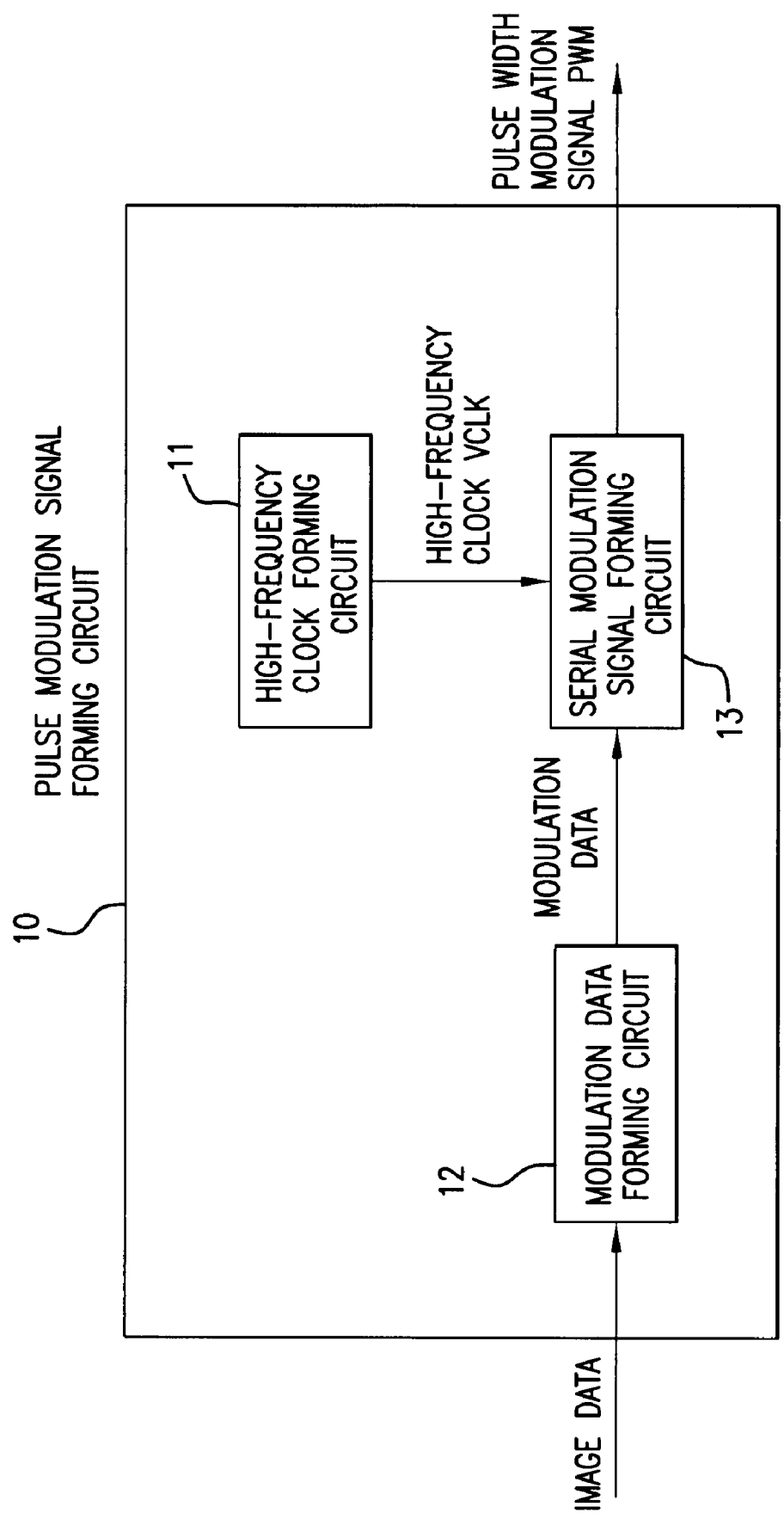
FIG. 11 is a diagram illustrating an example of the structure of a pulse modulation signal forming circuit.

Turning now to the image data as illustrated in FIG. 9, the image data is generally possible to be formed as a pulse width modulation signal PWM by using a pulse modulation signal forming circuit 10 as illustrated in FIG. 11.

The pulse modulation signal forming circuit 10 of FIG. 11 includes a high-frequency clock forming circuit 11, a modulation data forming circuit 12, and a serial modulation signal forming circuit 13.

The high-frequency clock forming circuit 11 forms a high-frequency clock VCLK remarkably faster than a pixel clock (i.e., a basic clock representing one pixel) that is generally required for an image forming apparatus.

The modulation data forming circuit 12 forms modulation data representing a desired bit pattern (for example, (0011), etc.) on the basis of image pattern to be given from the outside such as an image processing unit, although not illustrated.

The serial modulation signal forming, circuit 13 outputs the pulse modulation signal PWM by receiving modulation data output from the modulation data forming circuit 12 and converting it to a serial pulse pattern string (i.e., a pulse train) on the basis of the high-frequency clock VCLK.

It can be noted herein that the modulation data forming circuit 12 can be omitted if the modulation data from the outside could be given directly to the serial modulation signal forming circuit 13.

The greatest characteristic of the pulse modulation signal forming circuit 10 resides in that the serial modulation signal forming circuit 13 is possible to output the pulse modulation signal PWM by receiving the modulation data outputted from the modulation data forming circuit 12 and converting the modulation data to a serial pulse pattern string (or a pulse train) on the basis of the high-frequency clock VCLK.

For the serial modulation signal forming circuit 13, there may be used a shift register.

Figure 12:
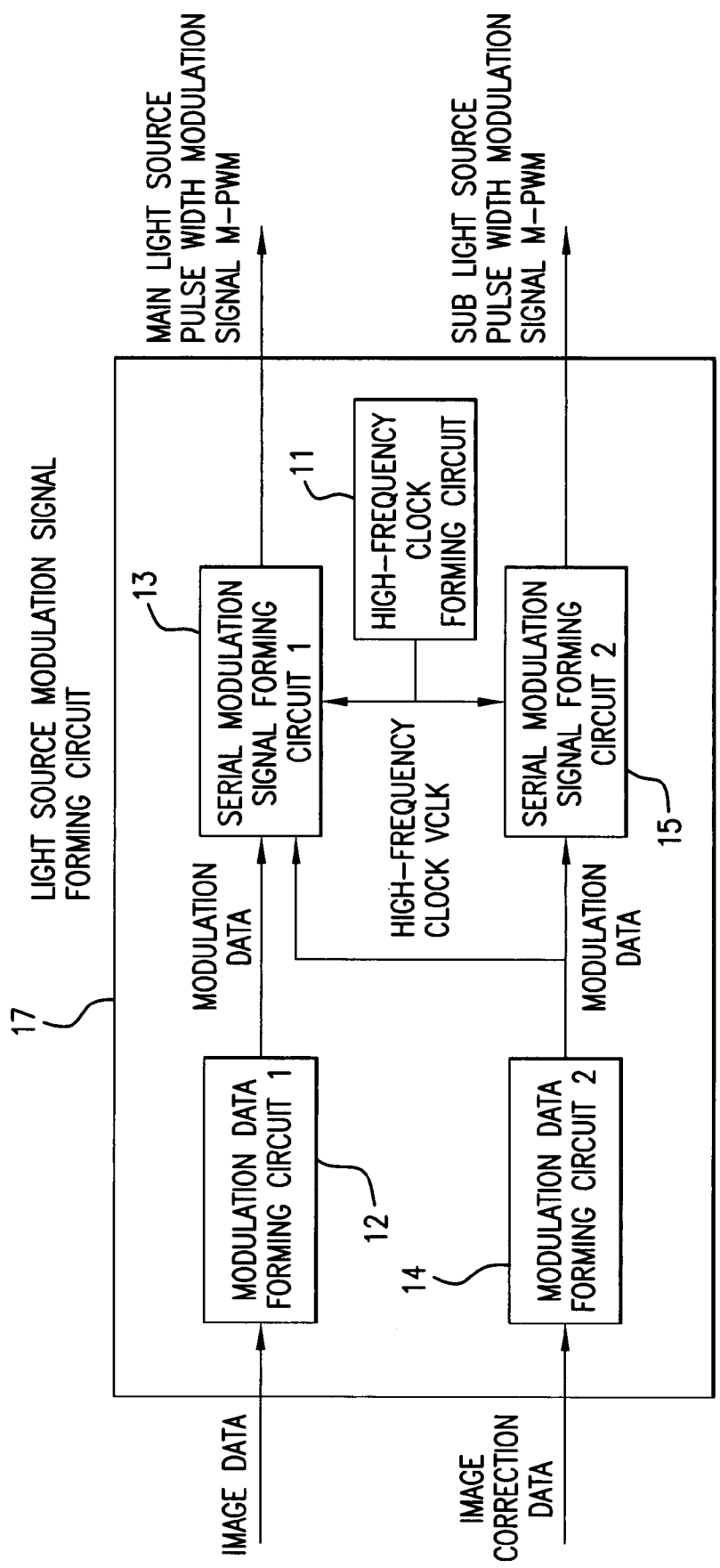
FIG. 12 is a diagram illustrating an example of the structure of a light source modulation signal forming circuit of the pulse modulation signal forming circuit of FIG. 11.

FIG. 12 illustrates a light source modulation signal forming circuit 17 for controlling light emission of the light source by forming the image data of FIG. 9 with the pulse modulation signal forming circuit 10 of FIG. 11 and using the control patterns of FIG. 10 which are combinations of the image data.

The light source modulation signal forming circuit 17 of FIG. 12 controls the light sources A and B by using the image data and the correction data as control data.

The image data as used, herein may include, for example, scanner image data for copiers and data upon printing.

The correction data as used herein may include, for example, data for correcting the position of pixel in the sub scanning direction with respect to the image data, such as correction data for correcting an image position in the sub scanning direction to be outputted from the sub-scanning pixel position detecting part 51 for detecting the position of the pixel in the sub scanning direction as described above.

For the light source modulation signal forming circuit 17 as illustrated in FIG. 12, the image data is converted to modulation data with the modulation data forming circuit 1 (12) and given to the serial modulation signal forming circuit 1 (13).

Likewise, the correction data is converted into the modulation data with the modulation data forming circuit 2 (14) and inputted into the serial modulation signal forming circuits 1, 2 (13, 15), respectively, which in turn output pulse width modulation signals (i.e., main light source pulse width modulation signal M-PWM and sub light source pulse width modulation signal S-PWM) on the basis of the modulation data from the modulation data forming circuit 1, 2 (12, 14) and the high-frequency clock to be outputted from the high-frequency clock forming circuit 11.

This relationship between the input and the output is illustrated in FIG. 9 as an image diagram.

As illustrated in FIG. 9, the pulse modulation signal for depicting the pattern image as illustrated therein is outputted on the basis of 4-bit image data.

The main light source pulse width modulation signal M-PWM is possible to be used as a driving control signal for the light source B and the sub-light source pulse width modulation signal S-PWM is possible to be used as a driving control signal for the light source A.

In this case, each, of seven kinds of control patterns as illustrated in FIG. 10 is possible to be selected as a control pattern for the correction data. In this embodiment, the light emitting time required for depicting the image pattern (or a one-pixel width) corresponding to the image data 8 (1000) is set as a reference light emitting time.

In each of the control, patterns as illustrated in FIG. 10, each image data of the light sources A and B is set to render the sum of the light emitting times of FIG. 9 corresponding to each image pattern of the light sources A and B equal to the reference light emitting time.

As illustrated in FIG. 10, a lookup table (LUT) representing the relationship between the control pattern and the image data is provided and the control pattern is selected from seven kinds of the control patterns on the basis of the correction data, thereby permitting a correction of the deviation in position of the pixel in the sub scanning direction.

For example, when the correction data is represented by (000), the pattern 1 of FIG. 10 is selected to control the driving of the light sources A and B by the image data 0, 8 of FIG. 9, respectively.

When the correction data is represented by (010), the pattern 3 of FIG. 10 is selected to control the driving of the light sources A and B by the image data 3, 5 of FIG. 9, respectively.

By using the light source modulation signal forming circuit 17 of FIG. 12 for the light source driving control part 50, the driving states of the two light sources A and B are possible to be varied in the manner as described in FIG. 4.

In the above embodiment, the description has been made regarding a specific circuit configuration in the case of the control of driving the light sources as illustrated in FIG. 4.

Figure 13:
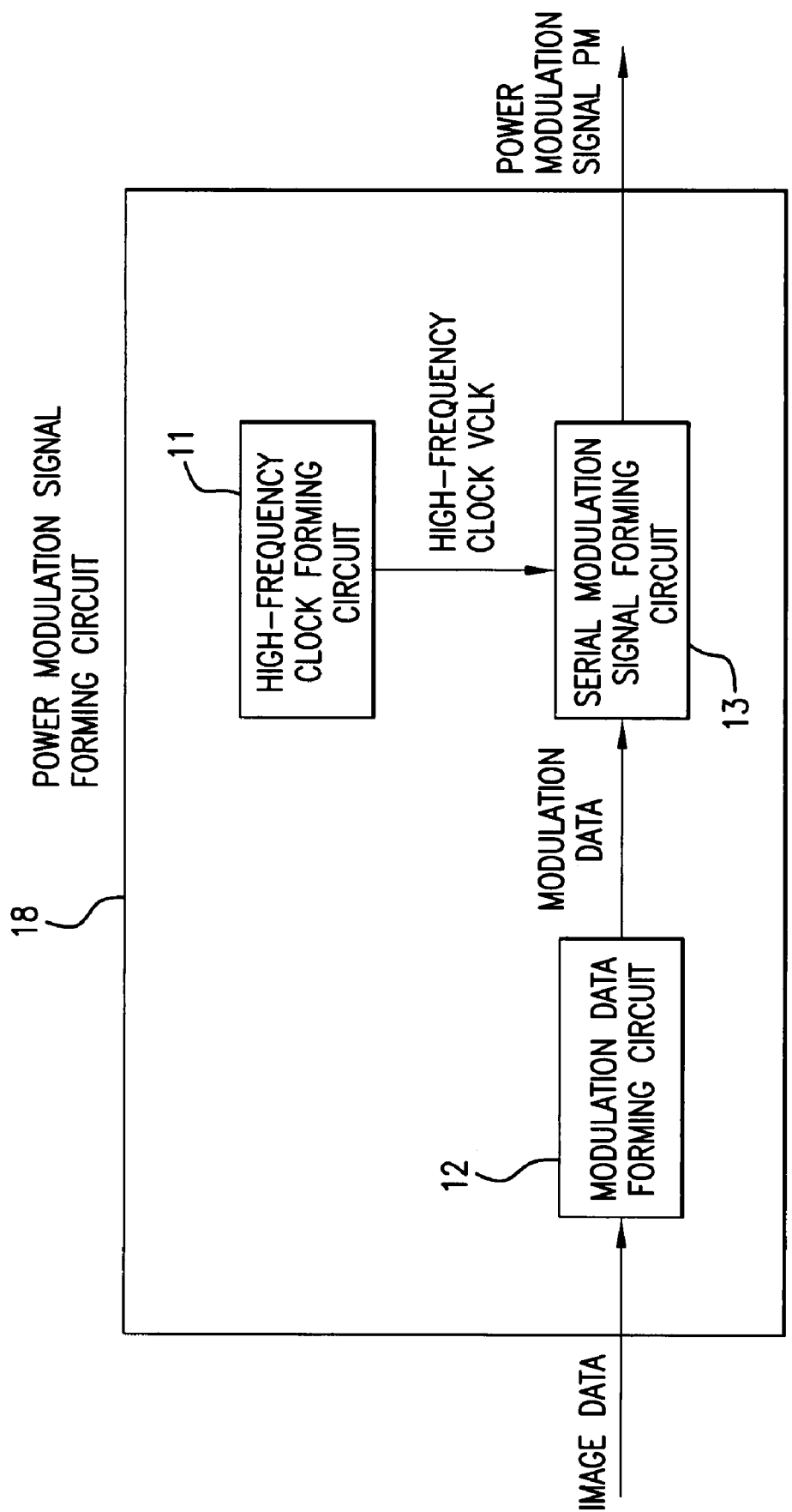
FIG. 13 is a diagram illustrating an example of the structure of a power modulation signal forming circuit.

In the event where the driving of the light sources is controlled in the manner as described in FIG. 8, a power modulation signal forming circuit 18 as illustrated in FIG. 13 may be used as a basic circuit configuration in place of the pulse modulation signal forming circuit 10 of FIG. 11.

In the power modulation signal forming circuit 18 of FIG. 13, the image data to be inputted to the modulation data forming circuit 12 indicates an amount of light emission (or intensity) of each light source.

The modulation data forming circuit 12 receives the image data and outputs the modulation data representing the light emitting intensity.

On the other hand, the serial modulation signal forming circuit 13 outputs serially the power modulation signal PM corresponding to the light emitting intensity representing the modulation data on the basis of the modulation data to be outputted from the modulation data forming circuit 12 and a high-frequency clock far faster than the image clock to be formed with the high-frequency forming circuit 11.

By applying the power modulation forming circuit 18 of FIG. 13 to the light source modulation signal forming circuit 17 of FIG. 12, the driving of the light sources is possible to be controlled in the manner as illustrated in FIG. 8.

In the case where the number of the light sources whose driving is to be controlled is three or more (for example, in the case where the driving control of the light sources is performed in the manner as illustrated in FIG. 7), a circuit configuration extended to the circuit configuration of FIG. 12 may be used.

In accordance with the embodiment of the present invention, various embodiments of driving the light sources are possible to be controlled in addition to the embodiments of driving the light sources in the manner as described above.

Third Embodiment

The optical scanning device according to a third embodiment of the present invention is configured basically in substantially the same manner as illustrated in FIG. 2 or FIG. 3, and forms one pixel with the m-odd light sources ($n \geq m \geq 2$) out of the n-odd light sources ($n \geq 2$) disposed at least at different positions in the sub scanning direction.

In the event where the deviation in position of the scanning line is corrected in this embodiment, an amount of shifting upon correction of the sub scanning direction is set to become equal to a distance between the adjacent light sources (as referred to as DS in FIG. 1) in the sub scanning direction in order to shift the light sources depicting the pixel in the sub scanning direction.

The manner of controlling the driving of the light sources according to the third embodiment is applied to a case where the pixel is a two-dimensional image of a general type except a line image and all pixels represent image data (i.e., a case where this is no "0" pixel).

Figure 14:
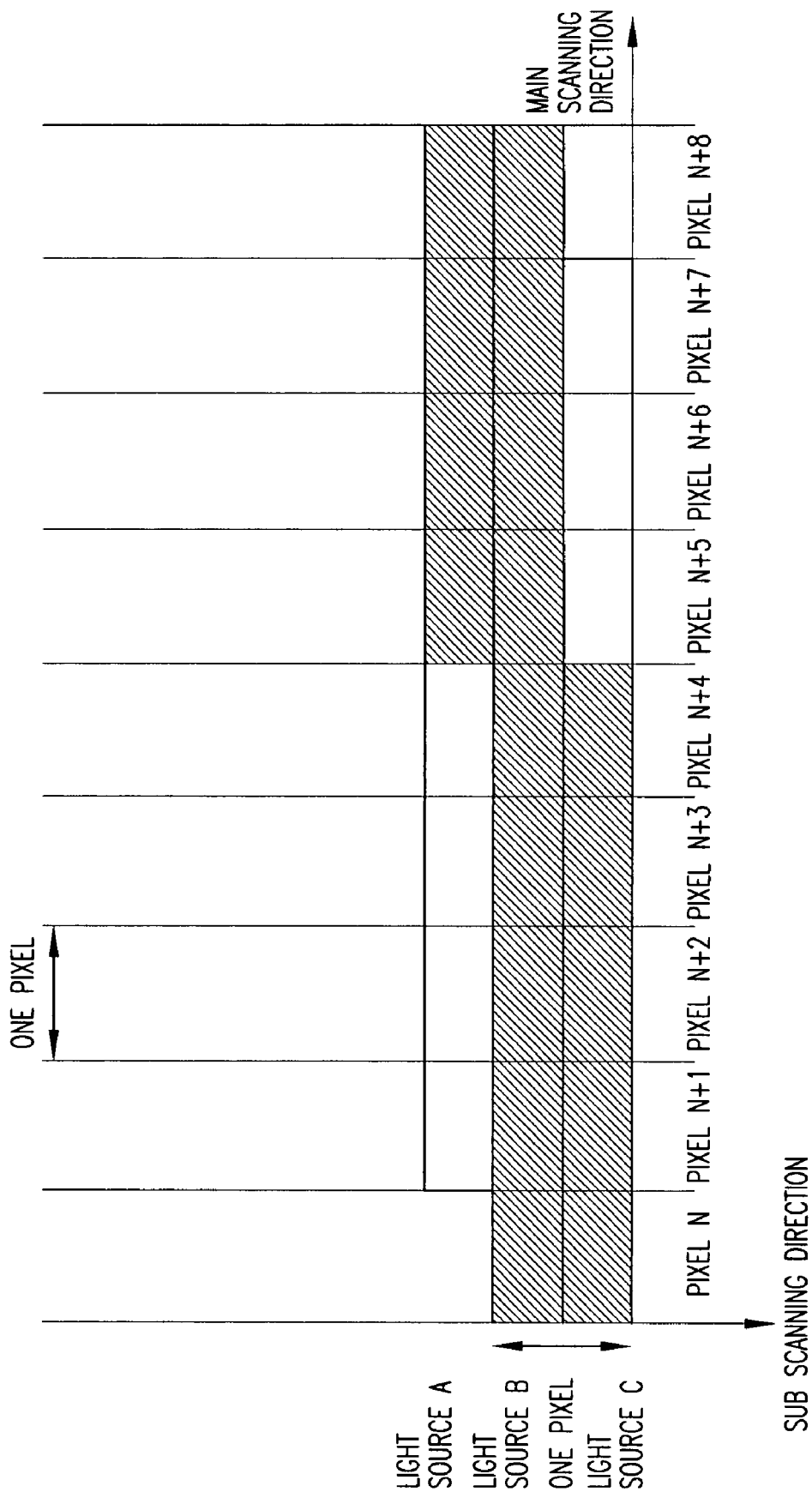
FIG. 14 is a schematic diagram illustrating a specific example of the light source driving control according to a third embodiment of the present invention, wherein one pixel is formed in the sub scanning direction with two light sources.

FIG. 14 illustrates a specific example of controlling the driving of the light sources according to the third embodiment.

In this embodiment, there is illustrated a case where a line having an equal height of one pixel is depicted in the main scanning direction (from the left side to the right side).

This line is deviated by one pixel downwardly under the sub scanning direction between from pixel N+5 to pixel N+8 of FIG. 14 due to a deviation resulting from an optical or mechanical factor.

In order to correct the deviation in position of the pixel in this case, the pixel to be depicted may be shifted by one pixel upwardly from the sub scanning direction (i.e., upwards in FIG. 14).

In other words, a pixel may be depicted upon transferring to the pixel N+5 by the light sources A and B.

An amount of shifting for correction in this case is made equal to the distance between the adjacent light sources (as referred to as DS of FIG. 1) in the sub scanning direction.

The correction of the position in the reverse direction is also possible to be made in the same manner as described above.

Figure 15:
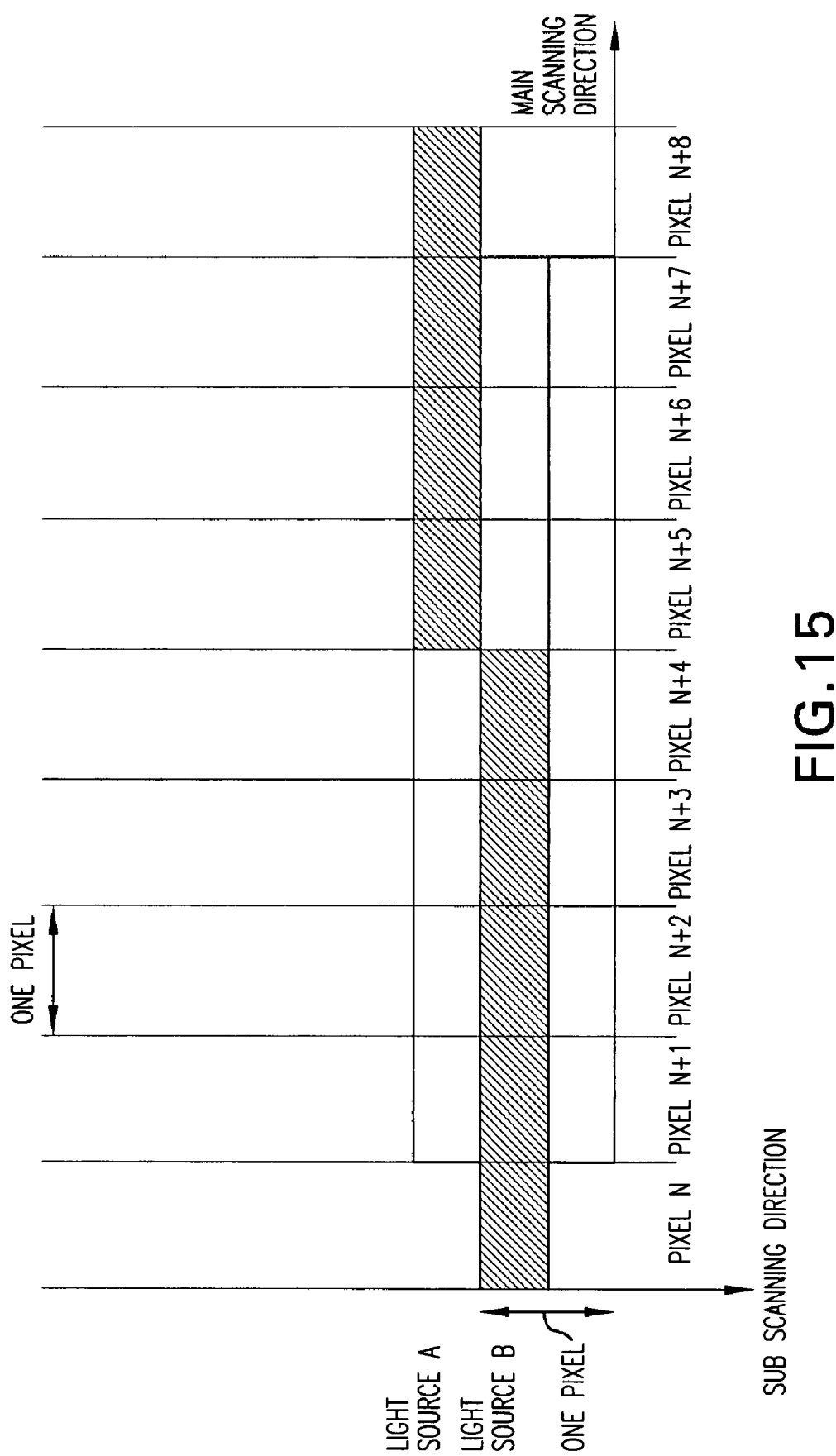
FIG. 15 is a schematic diagram illustrating a specific example of the light source driving control according to the third embodiment of the present invention, wherein one pixel is formed in the sub scanning direction with one light source.

FIG. 15 illustrates an example of correcting a deviation in position of a line upon depicting the line as high as one pixel in the main scanning direction (i.e., from the left side to the right side) with one light source.

This example illustrates a case where a line having a height equal to the height of cine pixel is depicted in the main scanning direction with the light source B and the pixels are deviated downwardly in the sub scanning direction by one pixel between pixel N+5 and pixel N+8 of FIG. 15.

In order to correct the deviation in position of the pixel in this case, the light source depicting the pixels N+5 et seq may be shifted from the light source D to the light source A and the pixels to be depicted may be shifted each by one pixel in the sub scanning direction (i.e., upwardly in FIG. 15).

By shifting the light source in the sub scanning direction in the manner as described above, the deviation in position of the scanning line in the sub scanning direction is possible to be corrected.

An accuracy of correction in this case is determined by a distance between the pixels.

In the event where one pixel is depicted, for example, at 600 dpi, an accuracy of correction of the deviation in position of the scanning line may be 600 dpi≈42.5 μm.

However, the deviation is recognized visually by the human's eyes with this accuracy.

On the other hand, in the event where a density of pixels is made considerably finer, for example, as small as a pitch of 2,400 dpi and 4,80 dpi, an accuracy of correction becomes approximately 10 μm and 5 μm, respectively, thereby making it unlikely to be recognized by human's eyes.

The density of pixels at 4,800 dpi or higher is practically unnecessary as an over-quality from the point of view of depicting the image and it cannot be said to be an optimal choice because an amount of data becomes too voluminous.

The example as illustrated in FIG. 15 has the drawbacks as described above.

On the other hand, in the case where the driving of the light sources for depicting one pixel with plural light sources is controlled as in the example as illustrated in FIG. 14, the image data of 600 dpi or 1,200 dpi is considered to be appropriate for the light sources for depicting the pixels, even if they have a resolution of, for example, 2,400 dpi or 4,800 dpi.

In other words, if a resolution of depicting the pixel is different from a resolution of the image data and the former is larger than the latter, the image data is possible to ensure its necessity and adequacy and the correction of the deviation in position of the scanning line is possible to be made in a finer fashion at this resolution of depicting the pixel.

As described above, the third embodiment is possible to correct the deviation in position of the scanning line caused by optical or mechanical factors in general images except line images.

Figure 16:
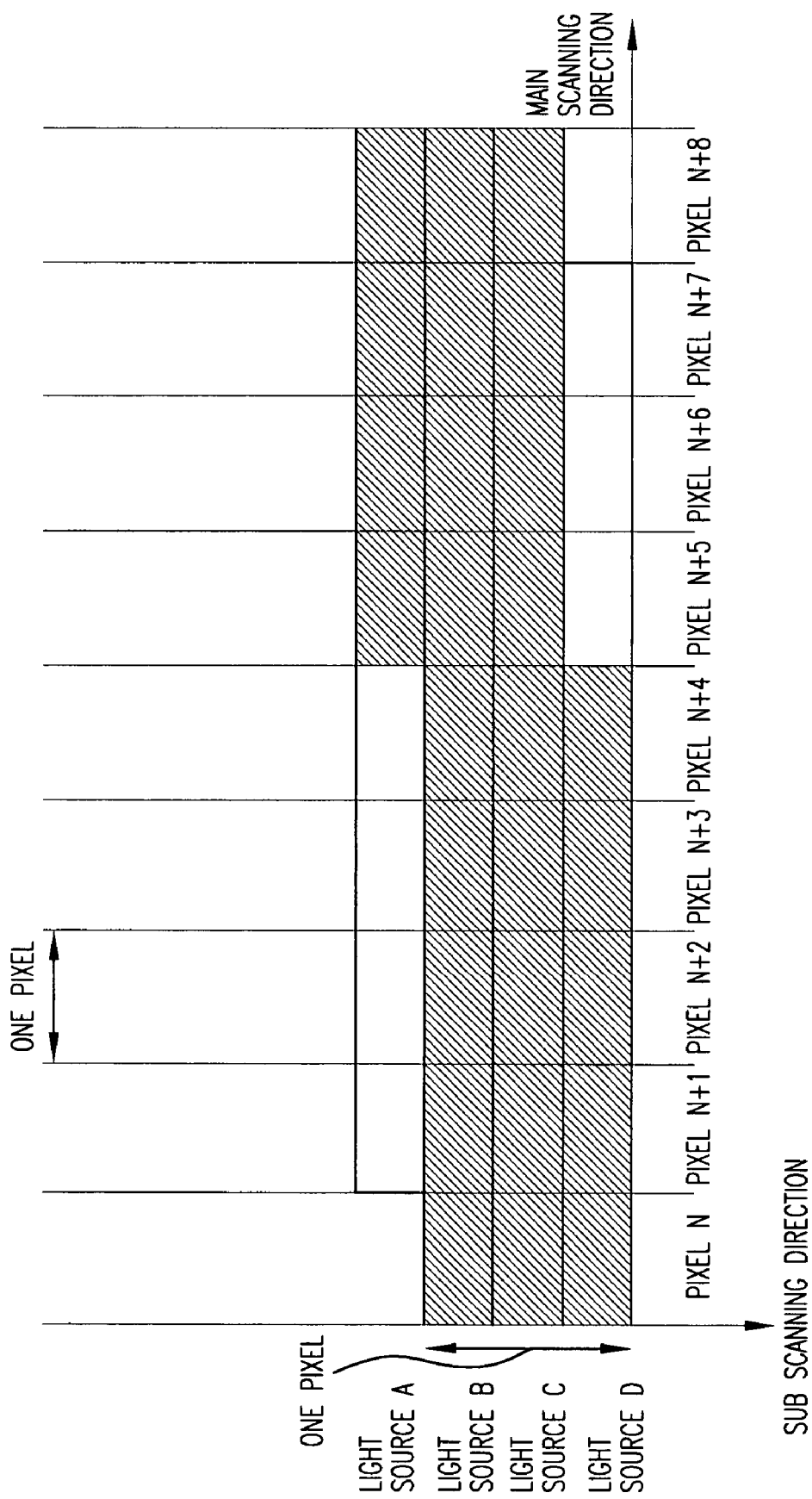
FIG. 16 is a schematic diagram illustrating a specific example of the light source driving control according to the third embodiment of the present invention, wherein one pixel is formed in the sub scanning direction with three light sources.

FIG. 16 illustrates a specific example of the light source driving control in a case where one pixel is formed with three light sources A, B and C in accordance with the third embodiment.

The light source driving control illustrated in FIG. 16 is also possible to correct the deviation in position of the scanning line caused by optical or mechanical factors in general images except line images.

Fourth Embodiment

The optical scanning device according to a fourth embodiment of the present invention has basically a configuration substantially similar to the configuration as illustrated in FIG. 2 or FIG. 3 and, as a first control pattern, forms one pixel with m-odd (n≧m≧2) light sources out of n-odd, light sources (n≧2) disposed at least at different positions in the sub scanning direction after the start of depicting the pixels.

Then, one pixel is formed with (m+1)-odd light sources from a certain position in the main scanning direction.

Further, thereafter, one pixel is again formed with the m-odd light sources from a certain position in the main scanning direction.

Upon correcting a deviation in position of the scanning line in this example, an amount of shifting the light sources in the sub scanning direction is set to be equal to a distance between the adjacent light sources (as referred to as DS of FIG. 1) in the sub scanning direction in order to shift the light sources depicting the pixels in the sub scanning direction.

Therefore, the light sources for use in depicting the pixels are shifted by one light source toward the sub scanning direction as compared with before the start and after the end of depicting the pixels.

Alternatively, as a second control pattern, one pixel is formed with m-odd (n≧m≧2) light sources but of n-odd (n≧2) light sources disposed at least at different positions in the sub scanning direction after the start of depicting the pixels and, thereafter, one pixel is formed with the (m+1)-odd light sources from a certain position in the main scanning direction.

In the first or second control pattern, the light source driving control part 50 renders smoothing processing for smoothing edges of pixels by stepwise changing the driving state of the light source among the (m+1)-odd light sources located at least at one end in the sub scanning direction during a period when one pixel is depicted with the (m+1)-odd light sources.

For the smoothing processing, there may be used PWM (pulse width modulation) or PM (power modulation) or a combination of PWM and PM.

The manner of controlling the driving of the light sources according to the fourth embodiment is possible to be applied to a case where the image is a line image and is provided with a meaningless pixel (i.e., pixel 0) outside the line image.

Figure 17:
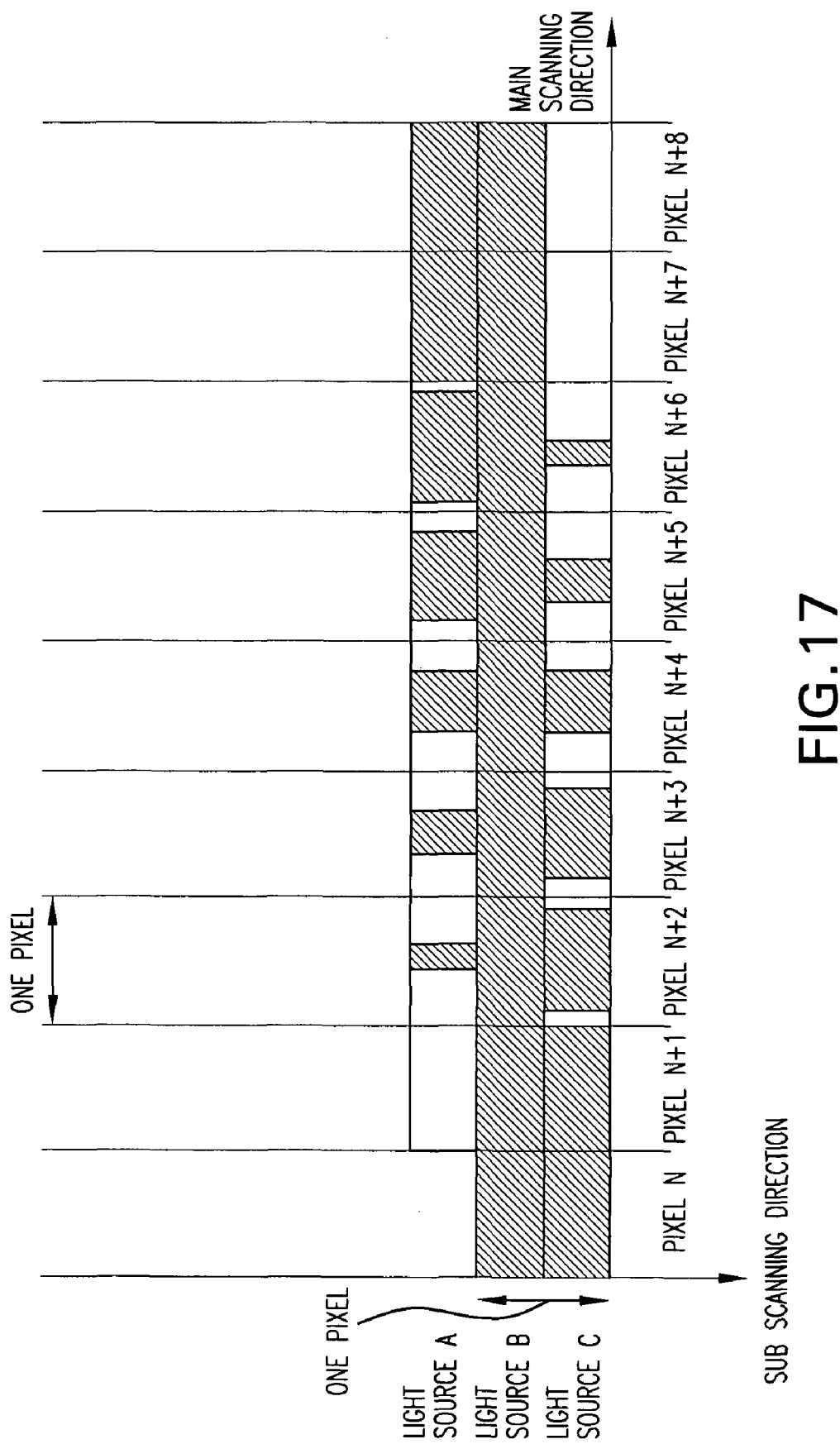
FIG. 17 is a schematic diagram illustrating a specific example of the light source driving control according to the third embodiment of the present invention, wherein one pixel is formed in the sub scanning direction by two light sources.

FIG. 17 illustrates a specific example of the light source driving control according to the fourth embodiment (or an example of the first control pattern according to the fourth embodiment).

In the example as illustrated in FIG. 17, one pixel is formed with two light sources B and C at: the initial stage as in the example of FIG. 14.

In the example of FIG. 17, however, the smoothing processing for the edges of the pixels is possible to be performed by rendering a pulse width modulation in association with the light sources C and A without shifting the light source from the light source C to the light source A suddenly at pixel N+5 as in the example of FIG. 14.

In other words, this example permits a correction of positions of pixels in a finer fashion than a pitch between the light sources.

In the example of FIG. 17 where, for example, the pulse width is set to 12, a finer correction of positions of the pixels is possible to be made upon the correction of a deviation in position of the scanning line by setting the pixels in such a manner as will be described hereinafter:

Pixel N+1 and beforehand:
    Light source C: PWM value 12; Light source A: PWM value 0
Pixel N+2:
    Light source C: PWM value 10; Light source A: PWM value 2
Pixel N+3:
    Light source C: PWM value 8; Light source A: PWM value 4
Pixel N+4:
    Light source C: PWM value 6; Light source A: PWM value 6
Pixel N+5:
    Light source C: PWM value 4; Light source A: PWM value 8
Pixel N+6:
    Light source C: PWM value 2; Light source A: PWM value 10
Pixel N+7:
    Light source C: PWM value 0; Light source A: PWM value 12

("PWM value 0" means no light emission.)

In other words, in the example as illustrated in FIG. 17, the edges of the pixels is possible to be smoothed by stepwise changing the driving states of the light sources disposed at both ends among the (m+1)-odd light sources (in this example, three light sources).

Figure 18:
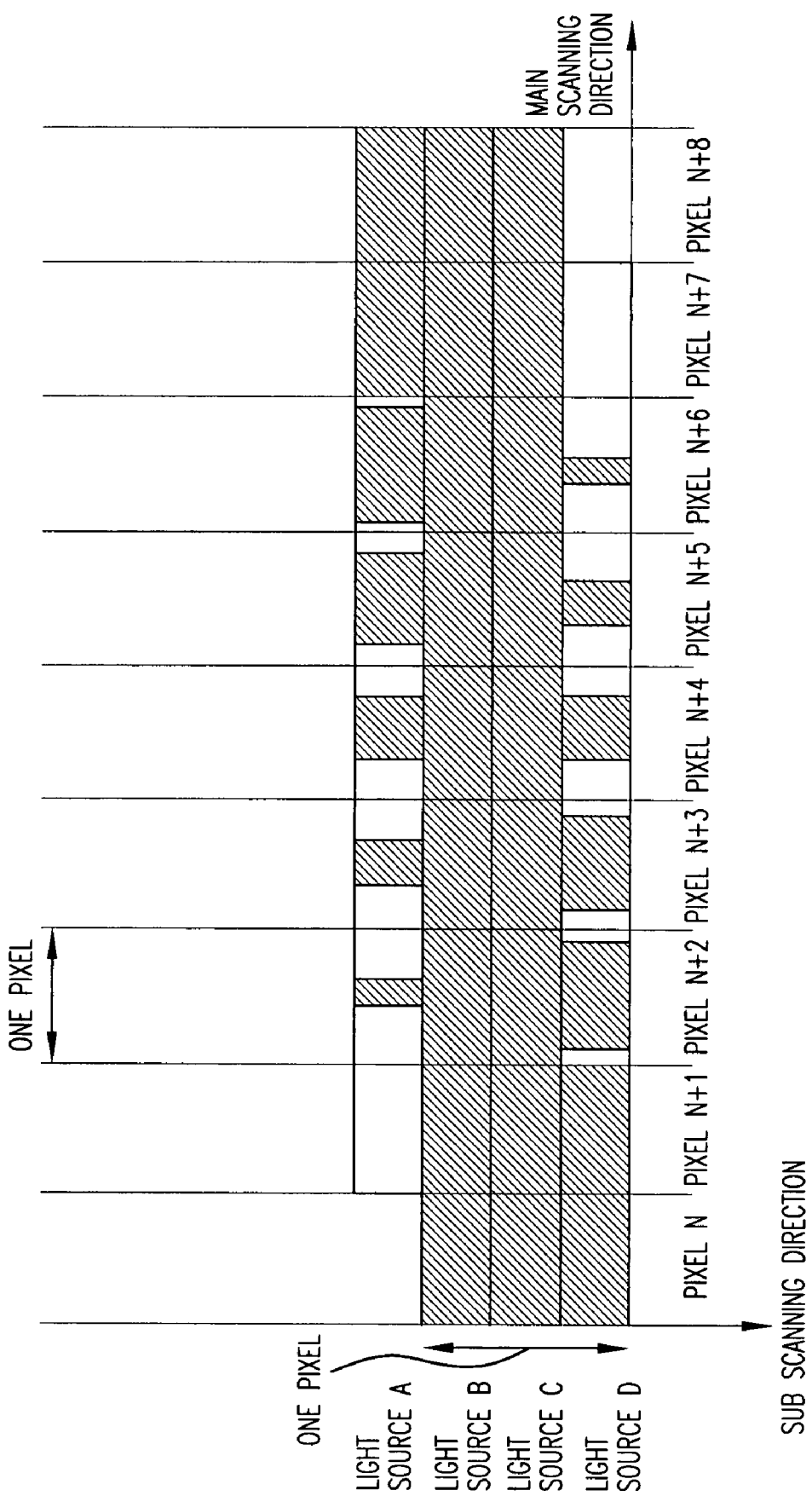
FIG. 18 is a schematic diagram illustrating a specific example of the light source driving control according to the fourth embodiment of the present invention, wherein one pixel is formed in the sub scanning direction with three light sources.

FIG. 18 illustrates a specific example illustrating the light source driving control according to the fourth embodiment in which one pixel is formed with three light sources A, B and C as in the example of the first control pattern in the fourth embodiment.

The example as illustrated in FIG. 18 is possible to smooth the edges of the pixels by stepwise changing the driving states of the light sources disposed at both ends, among the (m+1)-odd light sources (in this example, three light sources), as in the example as illustrated in FIG. 17.

Figure 19:
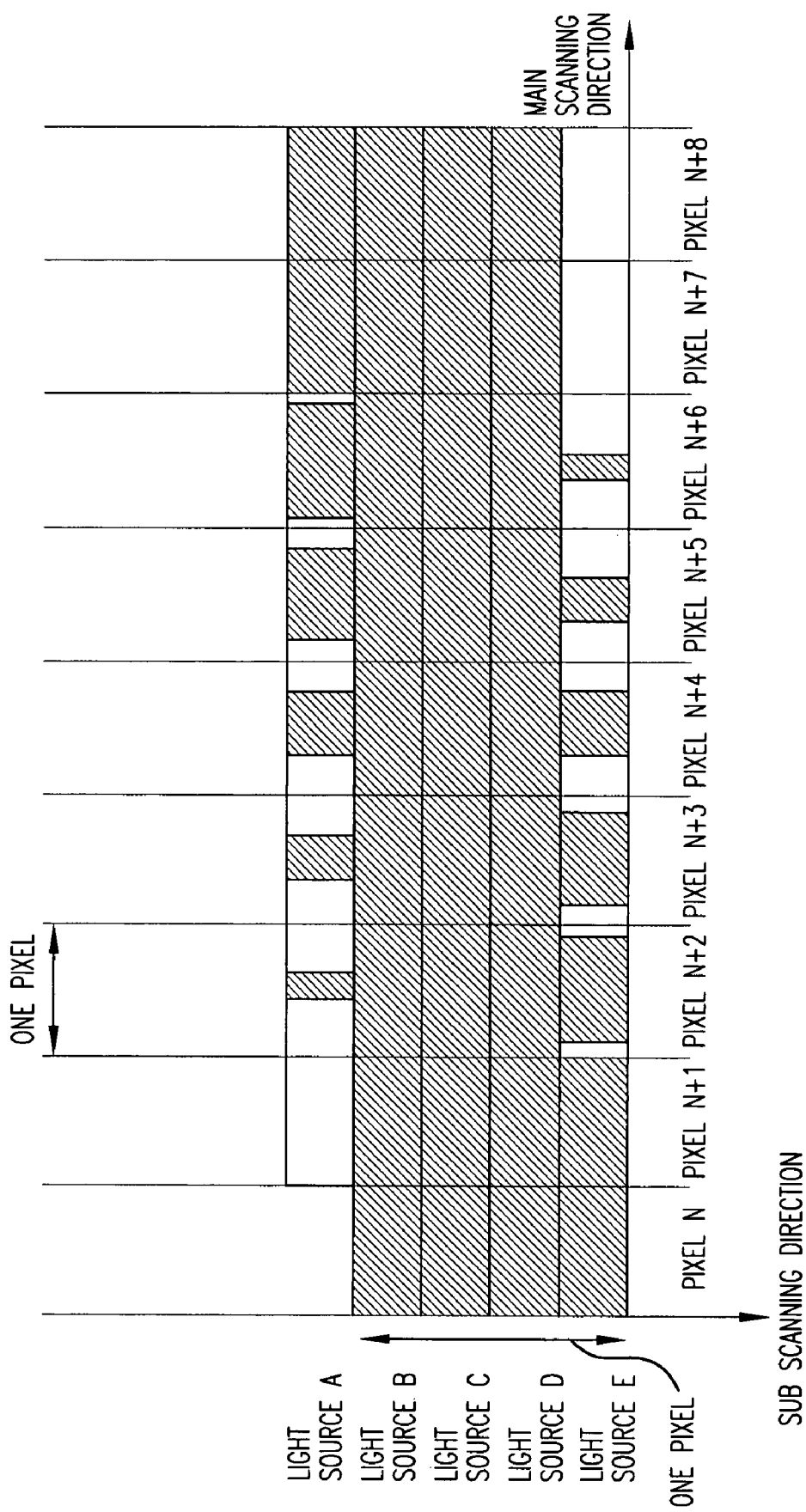
FIG. 19 is a schematic diagram illustrating a specific example of the light source driving control according to a fourth embodiment of the present invention, wherein one pixel is formed in the sub scanning direction with four light sources.

FIG. 19 illustrates an example according to the fourth embodiment, in which one pixel is depicted with four light sources B, C, D and E immediately after the start of depicting the pixel and then one pixel is depicted with five light sources A, B, C, D and E, followed by depicting one pixel with four light sources A, B, C and D.

In the example as illustrated in FIG. 19, for example, in the case where one pixel in the sub scanning direction is set to 600 dpi, the light sources are to be disposed at a pitch of 2,400 dpi.

Therefore, as in the example of FIG. 16, a sufficiently fine level of accuracy is possible to be achieved even if the light sources would be shifted suddenly at a certain pixel, however, a further smoother correction of the positions of the pixels is possible to be achieved by smoothing the edges of the pixels by stepwise changing the driving states of the light sources disposed at both ends by pulse width modulation (PWM).

Figure 20:
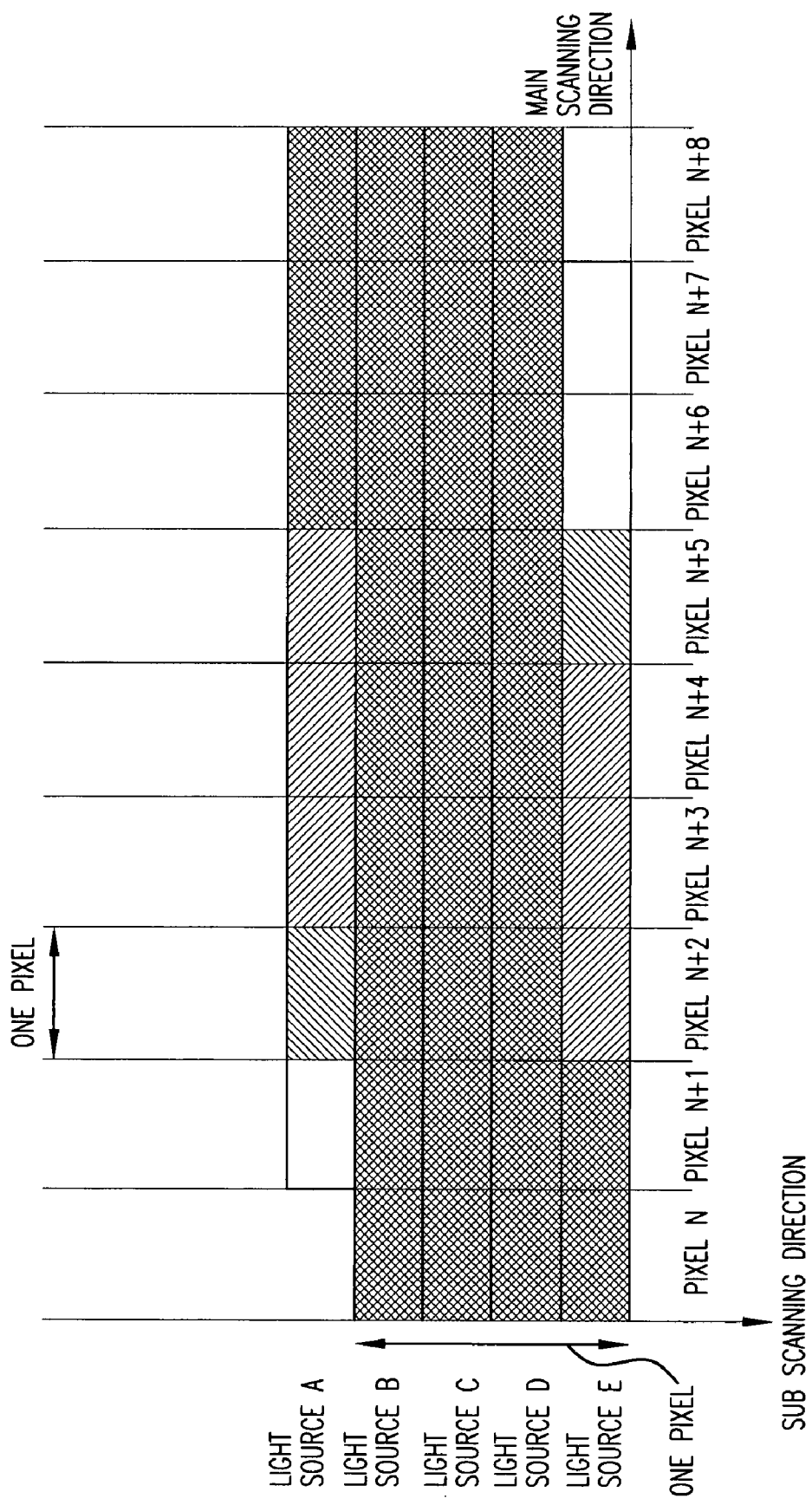
FIG. 20 is a schematic diagram illustrating a specific example of the light source driving control according to the fourth embodiment of the present invention, wherein one pixel is formed in the sub scanning direction with four light sources.

FIG. 20 illustrates an example of smoothing the edges of the pixels by power modulation (PM) in order to carry out a smooth correction of positions of the pixels, compared with the smoothing processing by pulse width modulation (PWM) as illustrated in FIG. 19.

In the case of power modulation, a direct current control part is provided to set a driving current of the light source at a desired value.

Figure 21:
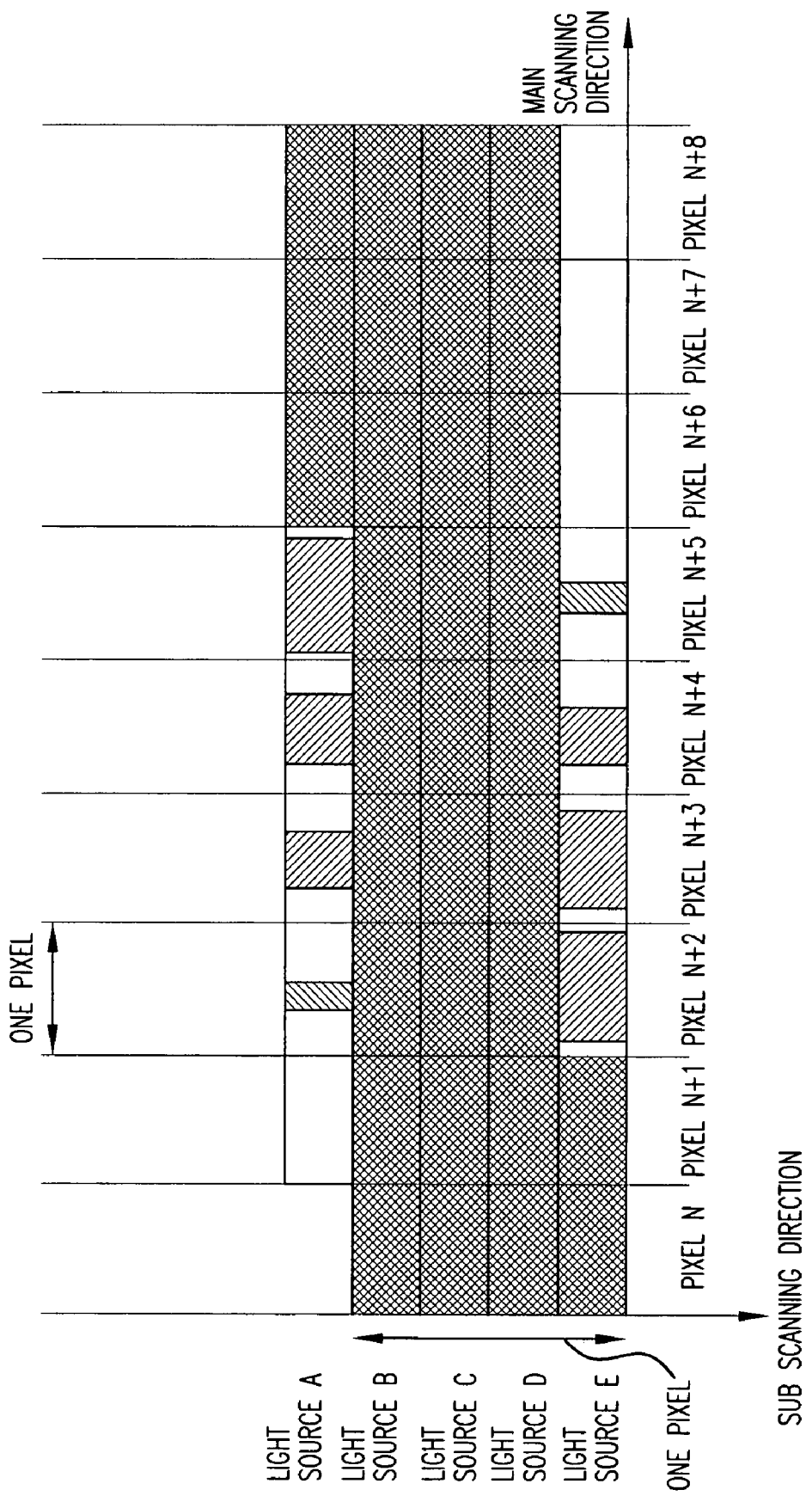
FIG. 21 is a schematic diagram illustrating a specific example of the light source driving control according to the fourth embodiment of the present invention, wherein one pixel is formed in the sub scanning direction with four light sources.
Figure 22:
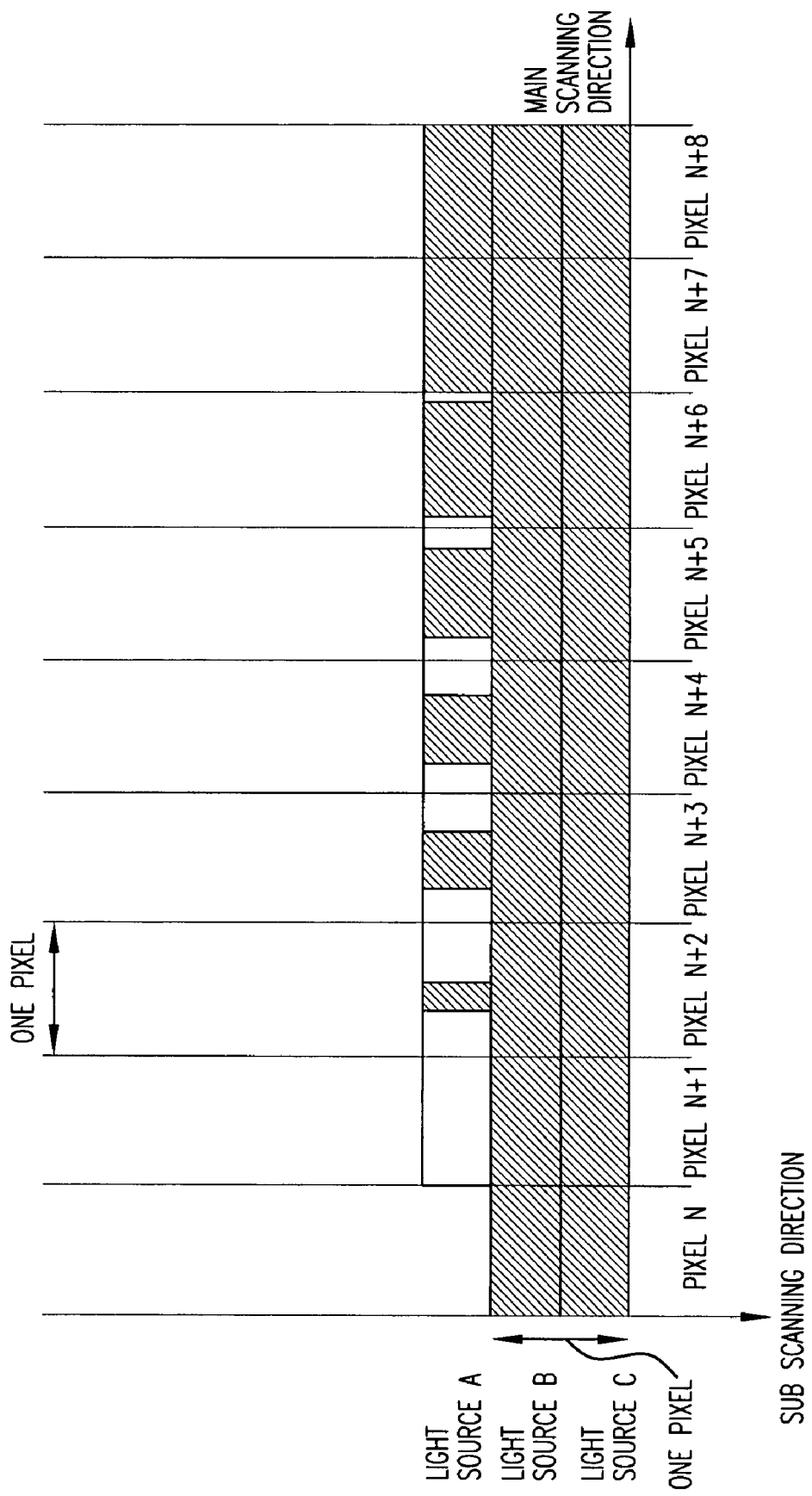
FIG. 22 is a schematic diagram illustrating a specific example of the light source driving control according to the fourth embodiment of the present invention, wherein one pixel is formed in the sub scanning direction with two light sources.

FIG. 21 illustrates an example of carrying out the smoothing processing by both of PWM and PM to render a further smoother correction of positions of the pixels.

This example enables a further smoother correction of positions of the pixels.

In the specific examples as illustrated in FIGS. 17 to 21, the smoothing processing is rendered for the edges of the pixels at both ends by stepwise changing the driving states of the light sources disposed at both ends of the (m+1)-odd light sources in the sub scanning direction in accordance with the first pattern of the fourth embodiment during a period when one pixel is depicted with the (m+1)-odd light sources.

In contrast to the examples as illustrated in FIGS. 17 to 21, FIG. 22 illustrates a specific example indicating the second control pattern according to the fourth embodiment, in which the smoothing processing for the edges of the pixels by stepwise changing the driving state of the light source only disposed at one end of the (m+1)-odd light sources during a period when one pixel is depicted with the (m+1)-odd light sources.

Although only the driving state of the light source disposed at one end of the (m+1)-odd light sources in the sub scanning direction in the first control pattern according to the fourth embodiment is possible to be stepwise changed, too, it is preferred that the specific examples as illustrated in FIGS. 17 to 21 be applied to the smoothing of the edges of the pixels disposed at both ends of the (m+1)-odd light sources in the sub scanning direction by stepwise changing the driving states of the light sources, because the first control pattern according to the fourth embodiment is more adequate for making the edges of the pixels smoother.

Further, the light source driving control part 50 may be arranged in such a manner that the driving control be conducted in accordance with the third embodiment, on the one hand, in the case of the image being a general two-dimensional image except a line image and the driving control be conducted in accordance with the fourth embodiment, on the other hand, in the case of the image being a line image.

Fifth Embodiment

Now, a description will be made regarding the case where the scanning line deviates upwards at it advances with reference to FIG. 31.

Figure 31:
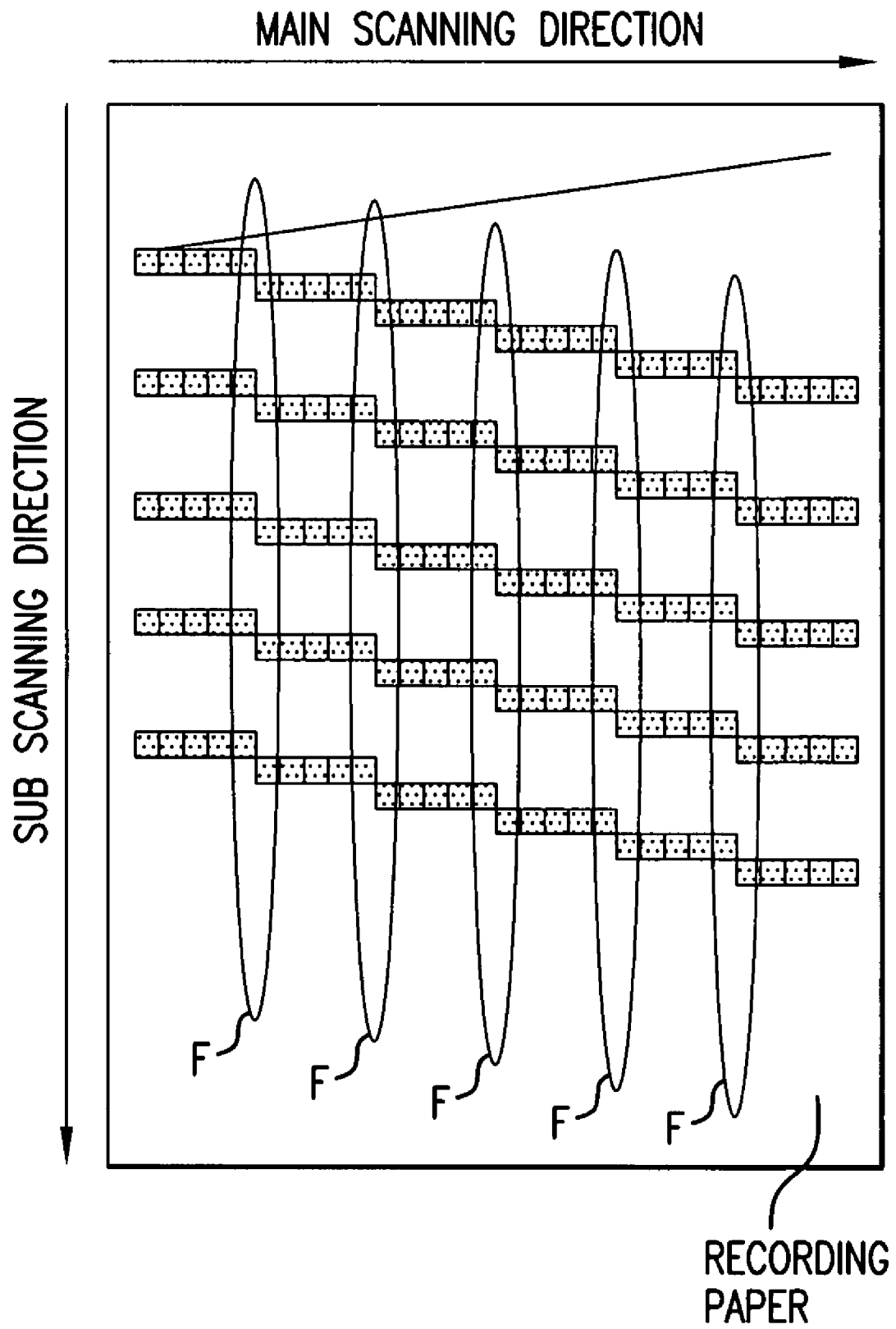
FIG. 31 is a diagram illustrating an example of a deviation in position of the scanning line in the sub scanning direction.

In this case, a deviation is possible to be corrected by making a correction so as to shift the pixels downwards as the scanning line advances in the main scanning direction, as illustrated in FIG. 31.

However, as illustrated in FIG. 31, if the correction (i.e., the shifting of the pixels) in the sub scanning direction for plural scanning lines is made at the same positions in the main scanning direction (i.e., the same address positions in the main scanning direction), banding such as irregularities of concentrations or longitudinal lines may be caused to occur in the sub scanning direction as illustrated as symbol F in the drawing.

The embodiment of the present invention is also possible to solve such problems.

The optical scanning device according to the fifth embodiment of the present invention forms one pixel with m-odd (n≧m≧2) light sources out of the n-odd (n≧2) light sources disposed at least at different positions in the sub scanning direction.

Upon correcting the deviation in position of the scanning line in the sub scanning direction in this embodiment, an amount of shifting for correcting the sub scanning direction is set to be equal to a distance between the adjacent light sources (as indicated by DS in FIG. 1) in the sub scanning direction in order to shift the light sources depicting the pixels in the sub scanning direction.

Further, in the event where the correction of a deviation in position of the scanning line in the sub scanning direction is to be performed continuously in the approximate scanning lines, the position in the scanning direction of the pixel for which the correction starts may differ in each scanning line.

In the event where a deviation in position of the scanning line in the sub scanning direction is corrected continuously in the adjacent scanning line, the position in the main scanning direction of the pixel for which the correction is to be started is arranged to differ in each scanning line to thereby prevent an occurrence of the banding (irregularities of concentrations and longitudinal lines) along the sub scanning direction.

The present invention will be described in more detail by specific examples, however, the following examples are not intended in any respect to limit the present invention and various changes and modifications should be understood to be encompassed within the spirit and scope of the present invention.

In a first example of this embodiment, the light source driving control part 50 is provided with a random number generating part for generating a random number, and the position in the main scanning direction of at least one pixel for which the light emitting light source is shifted is set on the basis of the random number from the random number generating part.

Figure 32:
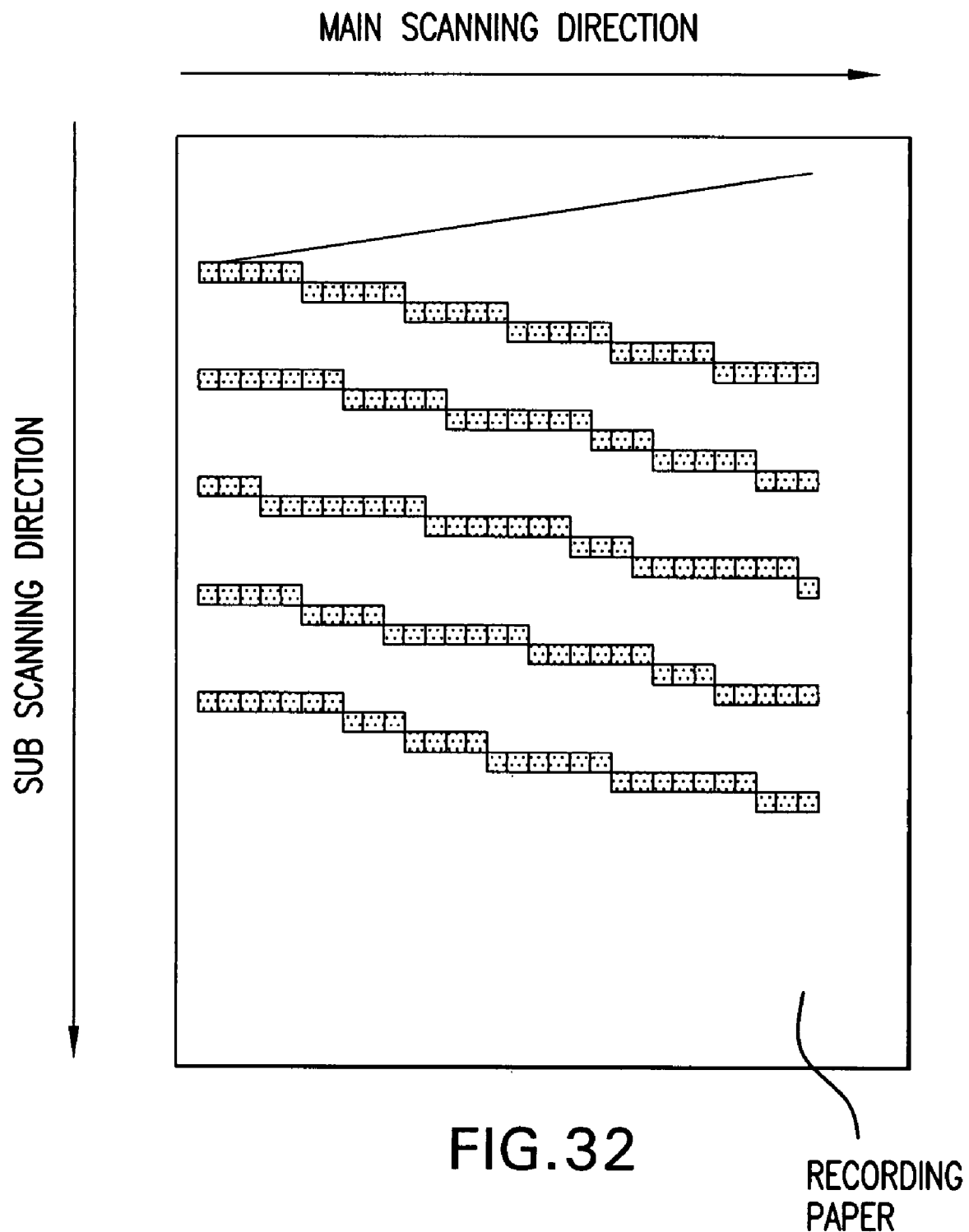
FIG. 32 is a diagram illustrating an example of correction according to a fifth embodiment of the present invention, in which the position of the pixel for which the correction starts is shifted in a random way.

FIG. 32 illustrates a first example in which the position in the main scanning direction of the pixel for which the correction is started is shifted in a random way upon correcting the deviation in position of the scanning line in the sub scanning direction.

In the example as illustrated in FIG. 32, the number of corrections of the deviation in position may be set to be identical in each scanning line (in FIG. 32, five times for each scanning line), however, the position in the main scanning direction of the pixel for which the correction starts is arranged to differ in each scanning line.

This prevents an occurrence of the banding (irregularities of concentrations or longitudinal lines) in the sub scanning direction.

Figure 33:
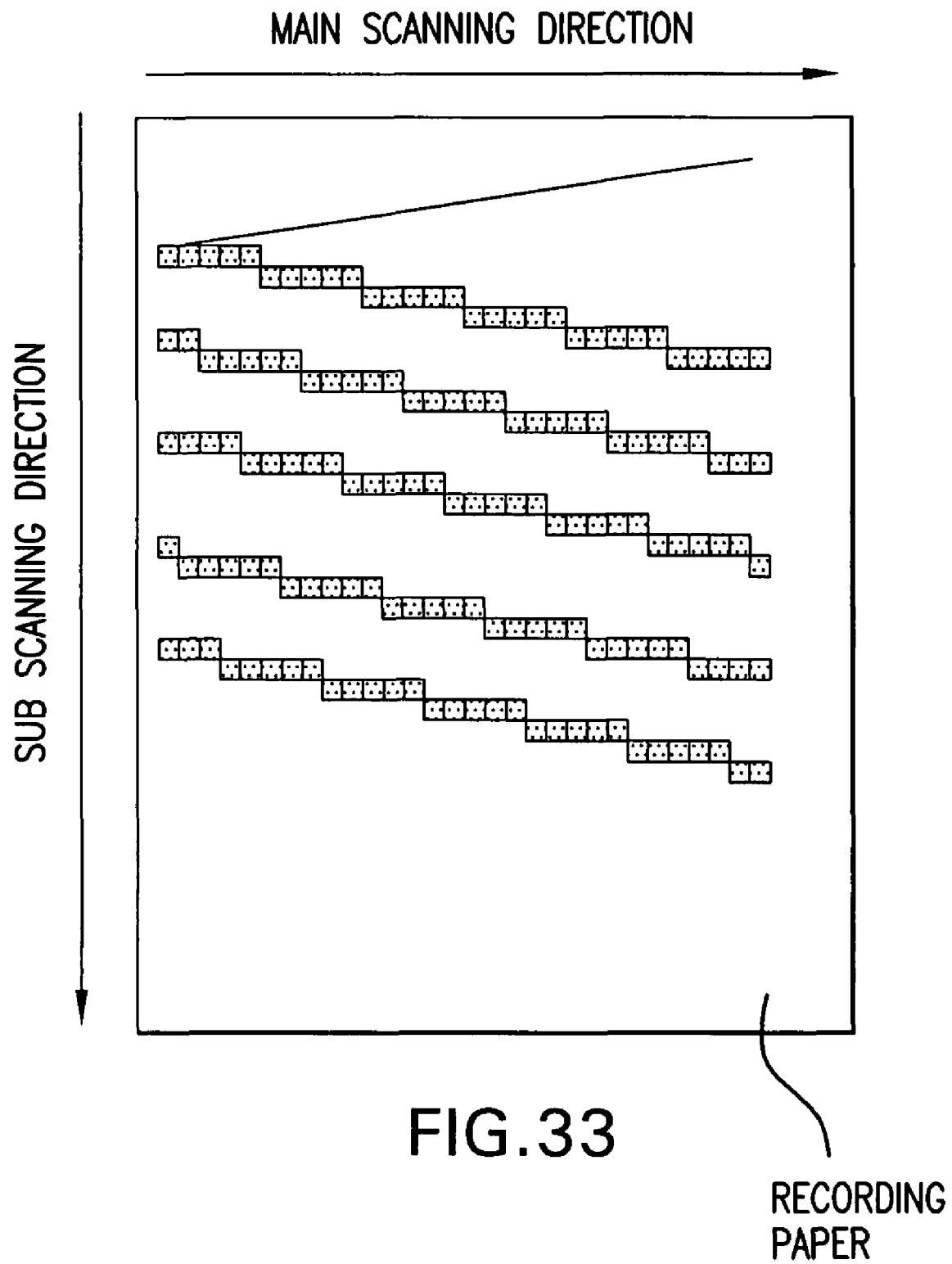
FIG. 33 is a diagram illustrating an example or correction according to the fifth embodiment of the present invention, in which the position of the pixel for which the correction starts first in each scanning line is set at a random position and the remaining position or positions is or are set at a constant cycle.

As a second example of this embodiment, the position of the pixel for which the correction starts is arranged in such a manner that only the position of the pixel for which the correction starts first is selected in a random fashion and the positions of the pixels for which the correction starts thereafter are selected at a constant cycle, which is illustrated in FIG. 33.

As a third example of this embodiment, the position of the pixel for which the correction starts is deviated by a predetermined amount in each of the scanning line.

Figure 34:
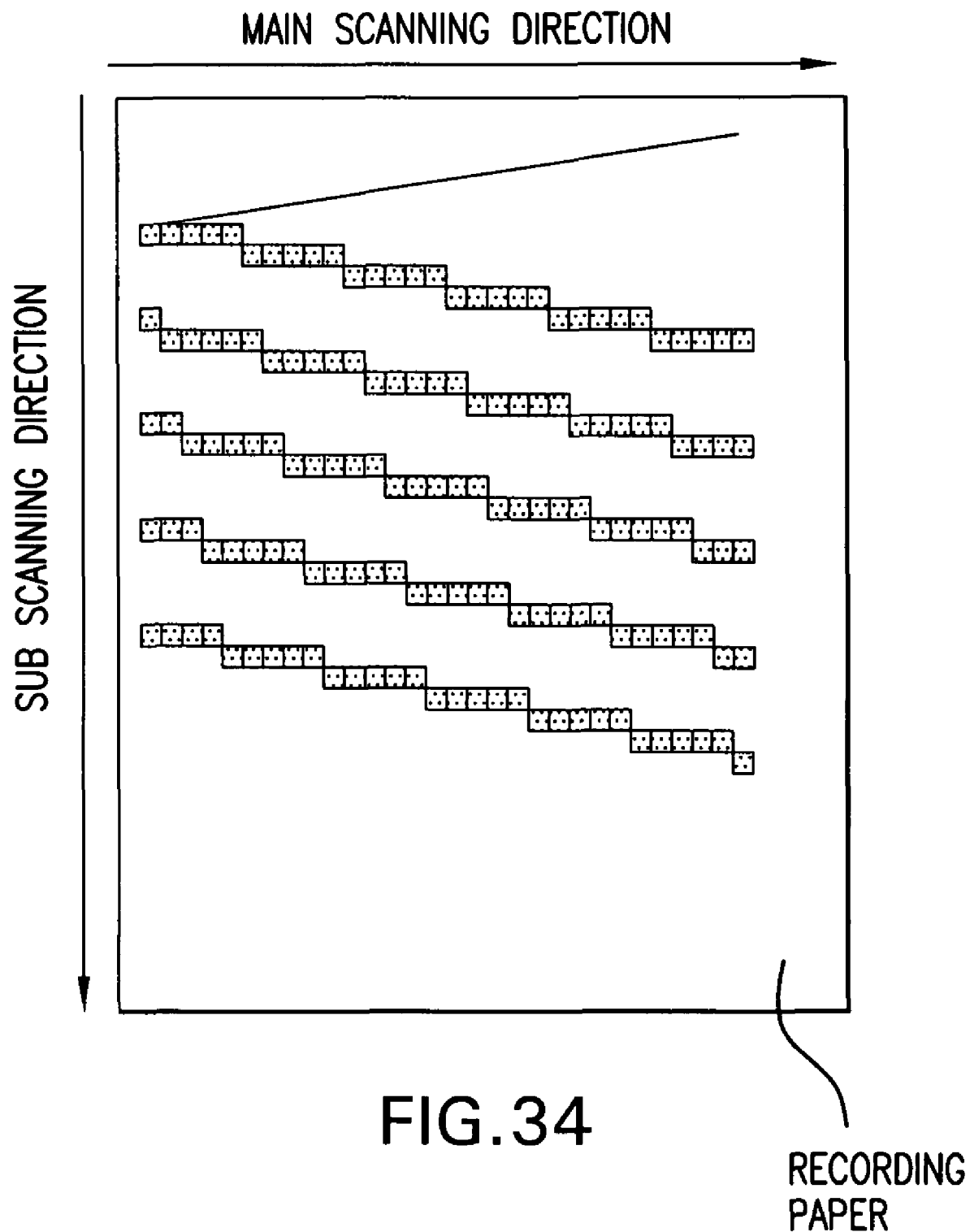
FIG. 34 is a diagram illustrating an example of correction according to the fifth embodiment of the present invention, in which the position of the pixel for which the correction starts is deviated by one pixel in each scanning line.

FIG. 34 illustrates an example in which the position of the pixel for which the correction starts is deviated by one pixel in each of the scanning lines.

Figure 35:
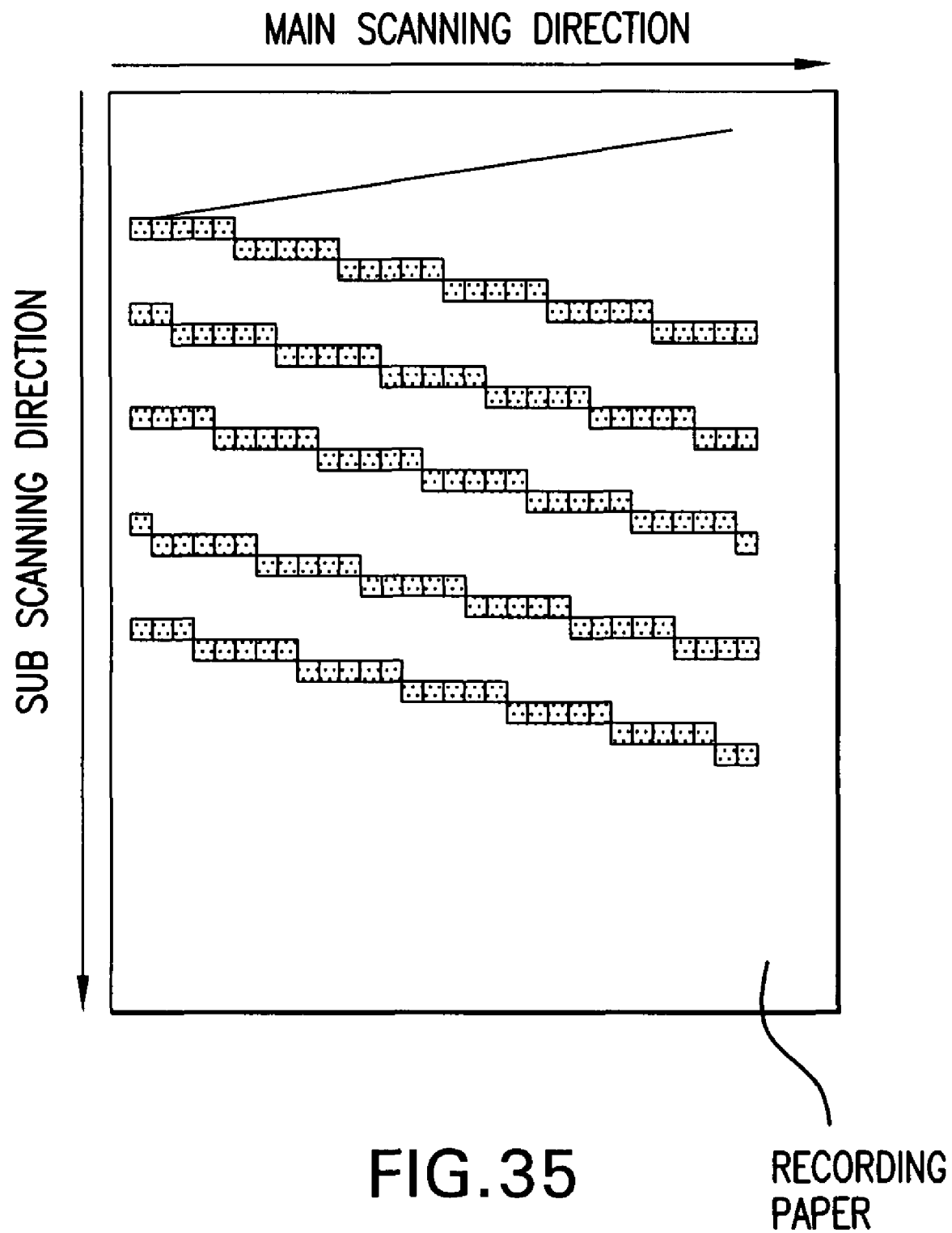
FIG. 35 is a diagram illustrating an example of correction according to the fifth embodiment of the present invention, in which the position of the pixel for which the correction starts is deviated by two pixels in each scanning line.

FIG. 35 illustrates an example in which the position of the pixel for which the correction starts is deviated by two pixels in each of the scanning lines.

As described above, an occurrence of the banding in the sub scanning direction is possible to be prevented by deviating the position of the pixel for which the correction starts by a predetermined amount.

As a fourth example of this embodiment, a memory part is provided which stores in advance the positions of the pixels for which the correction starts as correction starting pixel position information, and the light source driving control part 50 is possible to shift the positions of the pixels for which the correction is to be started on the basis of the correction-starting pixel position information stored in the memory part.

FIG. 36 illustrates an example in which a lookup table (LUT) is used as the memory part.

Further, as illustrated in FIG. 36, an address indicates each of the scanning lines and a clock count value indicates the position of the pixel for which the correction starts in each scanning line as an interval (i.e., a number of pixels) along the main scanning direction.

As a fifth example of this embodiment, there is provided a count value forming part for forming a count value that is smaller than a total number of the pixels located in the main scanning direction and does not coincide with the total number of the pixels in the main scanning direction when it is multiplied by an integer, and the correction is possible to be made for every interval of the pixels of this count value.

As the count value is set so as to fail to coincide with the total number of the pixels in the main scanning direction even if it is multiplied by an integer, the interval of the pixels corresponding to the count value cannot be ensured at the end point of each scanning line.

A portion of the number of the pixels which cannot be ensured is set at the position of the pixel for which the correction starts first in the next scanning line.

Figure 37:
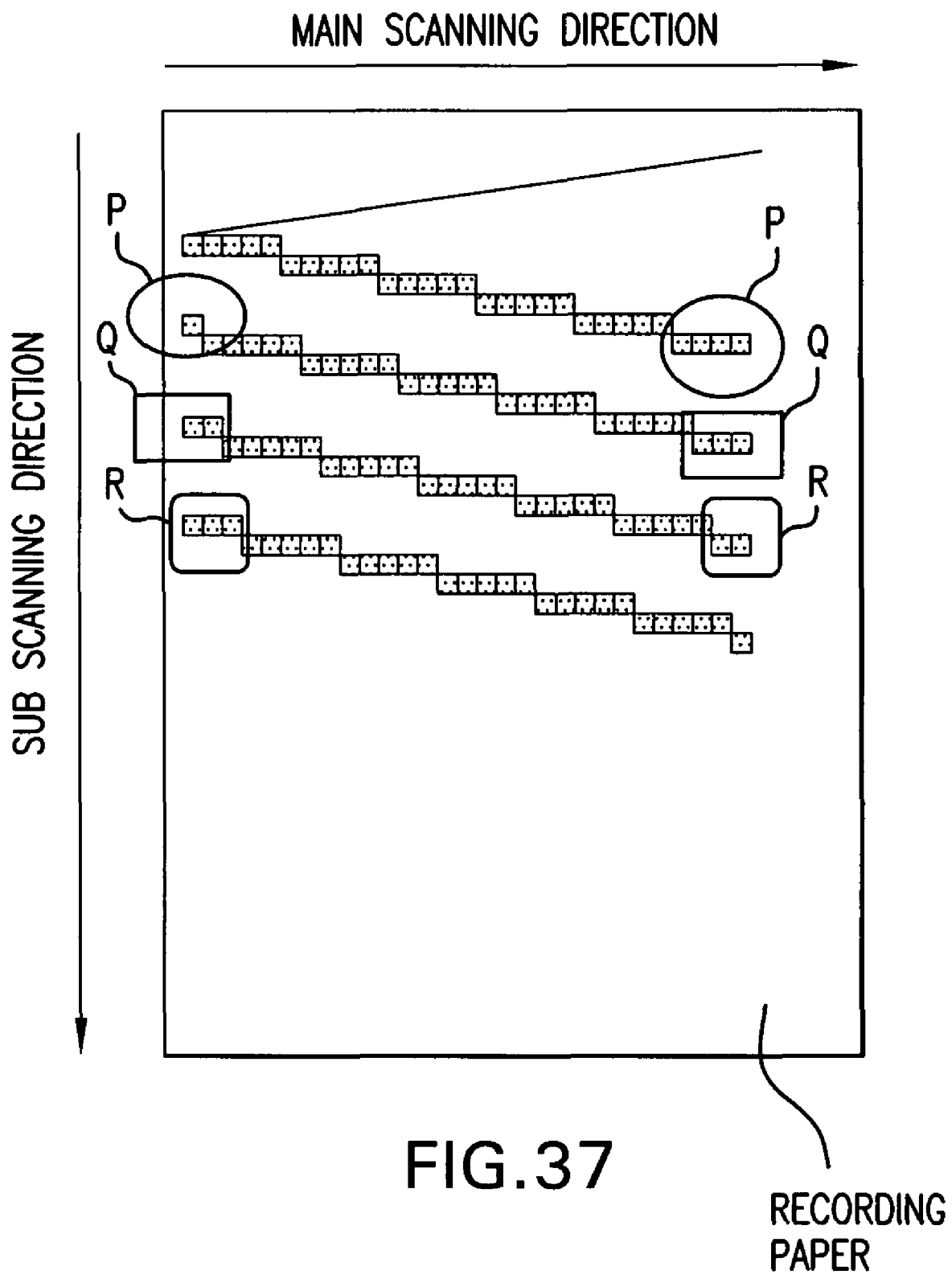
FIG. 37 is a diagram illustrating an example of correction according to the fifth embodiment of the present invention, in which the position of the pixel for which the correction starts is set on the basis of a counter value.

FIG. 37 illustrates an example in which the correction is made for every interval of five pixels by setting the total number of the pixels in one scanning line to 29 and the count value to 5.

In this case, the number of the pixels to be ensured at the end point in the first scanning line is 4 so that one pixel is deficient from the count value of 5.

This one pixel that is deficient in the first scanning line is set at the position of the pixel in the second line for which the correction is to be started first.

Likewise, as the number of the pixels to be ensured at the end point in the second scanning line is three, two pixels lack for the count value of 5.

The resulting two pixels that lack are set at the positions of the pixels in the third scanning line for which correction starts first.

Further, likewise, as the number of the pixels to be ensured at the end point in the third scanning line is three, three pixels lack for the count value of 5.

The resulting three pixels that lack are set at the positions of the pixels in the fourth scanning line for which correction start first.

In other words, for portions P, Q and R, which are each enclosed by circle or corner-rounded square in FIG. 37, the sum of the number of the pixels in each scanning line becomes a count value of 5.

By making the correction in the manner as described above, the position of the pixel in each scanning line, for which the correction starts first, differs from each other in the main scanning direction so that an occurrence of the banding in the sub scanning direction is possible to be avoided.

Sixth Embodiment

In an optical scanning device according to a sixth embodiment of the present invention, the main scanning direction is divided into sections K and the correction is made in accordance with the fifth embodiment for every K-sectional range.

Figure 38:
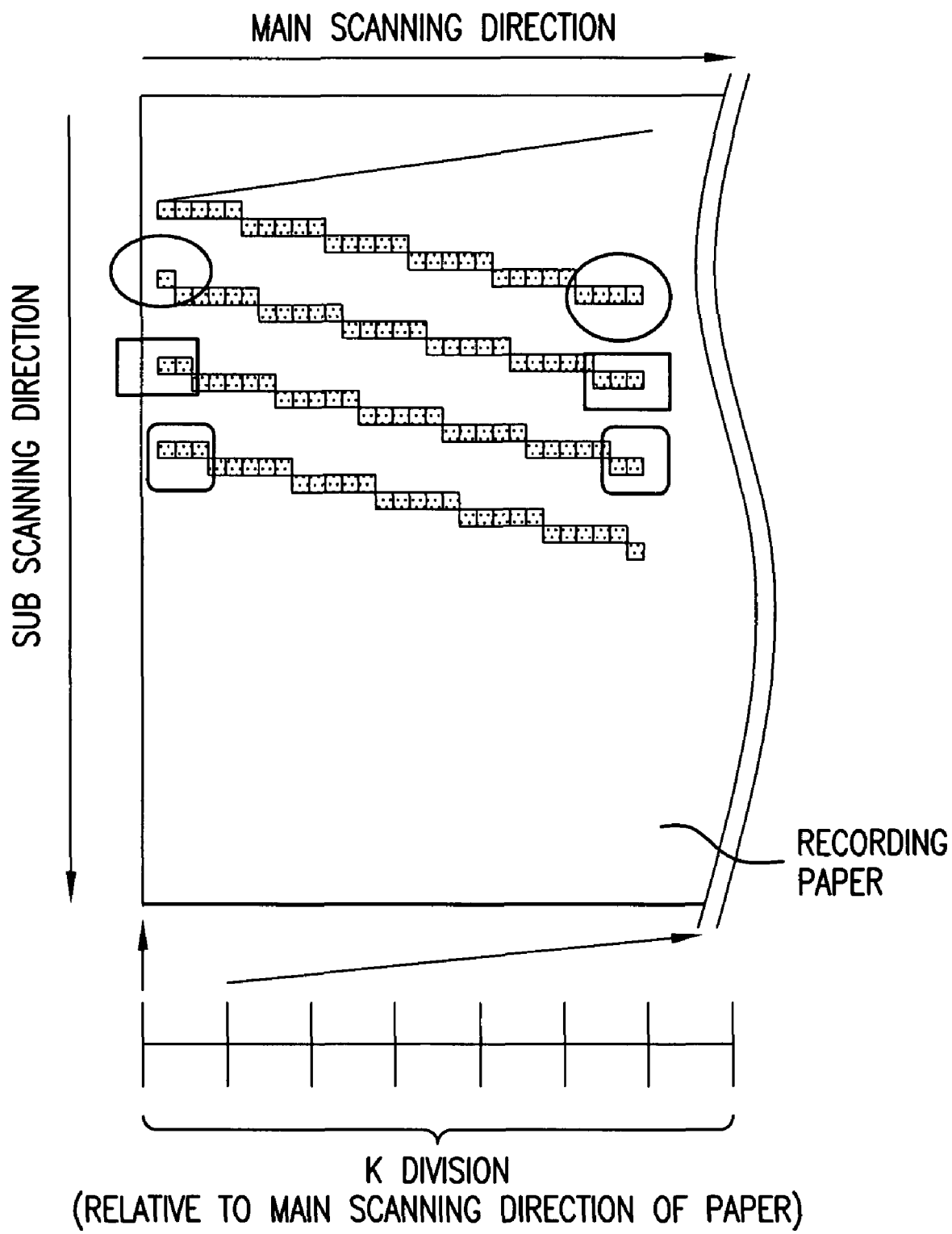
FIG. 38 is a diagram illustrating an example of correction according to a sixth embodiment of the present invention, in which the main scanning direction is divided into K-odd sections and the correction is made for each the K-odd sections.

FIG. 38 illustrates an example in which the main scanning position is divided into sections K and the above correction is made for every region corresponding to the section K.

Although FIG. 38 illustrates an example where the correction is made by the method as illustrated in FIG. 37, the correction can be made by either of the methods as illustrated in FIGS. 32 to 37, inclusive.

By dividing the main scanning direction into sections K and the correction is made for every region corresponding to each of the sections K, an occurrence of the banding in the sub scanning direction is possible to be avoided.

In each of the embodiments as described above, there may be used semiconductor laser (for example, a semiconductor laser array) as the n-odd light sources.

More specifically, it is preferred that vertical-cavity surface-emitting laser or A vertical-cavity surface-emitting laser array with n-odd vertical-cavity surface-emitting lasers disposed in an array-like arrangement on the identical chip be used as the n-odd light sources.

The vertical-cavity surface-emitting lasers with plural light sources are possible to save electricity compared with usual semiconductor lasers being used simultaneously.

They are possible to provide light sources in accordance with a resolution or speed because plural light sources are possible to be disposed with ease and the light sources are possible to be set in an optional arrangement. Therefore, an electric power saving and higher accuracy scanning are possible.

Seventh Embodiment

A seventh embodiment according to the present invention is directed to an image forming apparatus using the optical scanning device according to the embodiment of the present invention described above.

Figure 23:
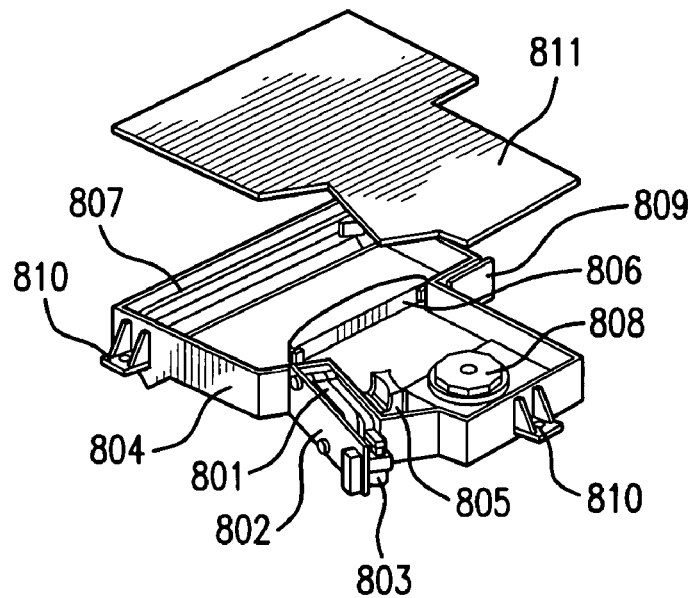
FIG. 23 is a diagram illustrating an example of an image forming apparatus using the optical scanning device according to the embodiment of the present invention.

FIG. 23 illustrates an example of an image forming apparatus of the embodiment of the present invention with the optical scanning device incorporated therein.

On the back surface of a light source unit 801 are mounted a printed circuit board 802 with a driving circuit and a pixel clock forming unit formed thereon for controlling the semiconductor laser.

The light source unit 801 is in abutment with the wall surface of an optical housing in the direction perpendicular to the optical axis with a spring, and its posture is set by adjusting its inclination with an adjustment screw 803 which in turn is threaded with a projection (not shown) formed on the housing wall surface.

Inside the optical housing, a cylindrical lens 805, a polygon motor 808 with a polygon mirror for rotating the polygon mirror, a fθ lens 806, a toroidal lens and a turning mirror 807 are each aligned and held.

A printed circuit board 809 with a synchronization detecting sensor mounted thereon is fitted on the outer housing wall surface.

The optical housing is sealed at its top with a cover 811 and secured with a frame member of the main body of the image forming apparatus through plural mountings 810 projecting from the wall surface with screws.

As the light source unit 801, there may be used the semiconductor laser array or vertical-cavity surface-emitting lasers (or a vertical-cavity surface-emitting laser array), each having plural light sources as illustrated in FIG. 1.

Light emitted from the semiconductor laser is deflection-scanned with the polygon mirror mounted on the polygon motor 808 through the cylindrical, lens 805.

The light flux deflection-scanned is incident to a photosensitive drum (not illustrated) through the fθ lens 806, the toroidal lens and the turning mirror 807, etc.

The interval of time between two predetermined points extending in the main scanning direction is detected with a synchronization detecting sensor by using a scanning light.

An amount of the deviation in position of the pixels in the sub scanning direction is possible to be detected with a position detecting sensor (not illustrated).

These values detected are subjected to feedback to the semiconductor laser, modulation circuit or modulation forming part mounted at its previous stage, etc.

Next, a description will be given regarding a multi-beam scanning apparatus using plural light sources.

Figure 24:
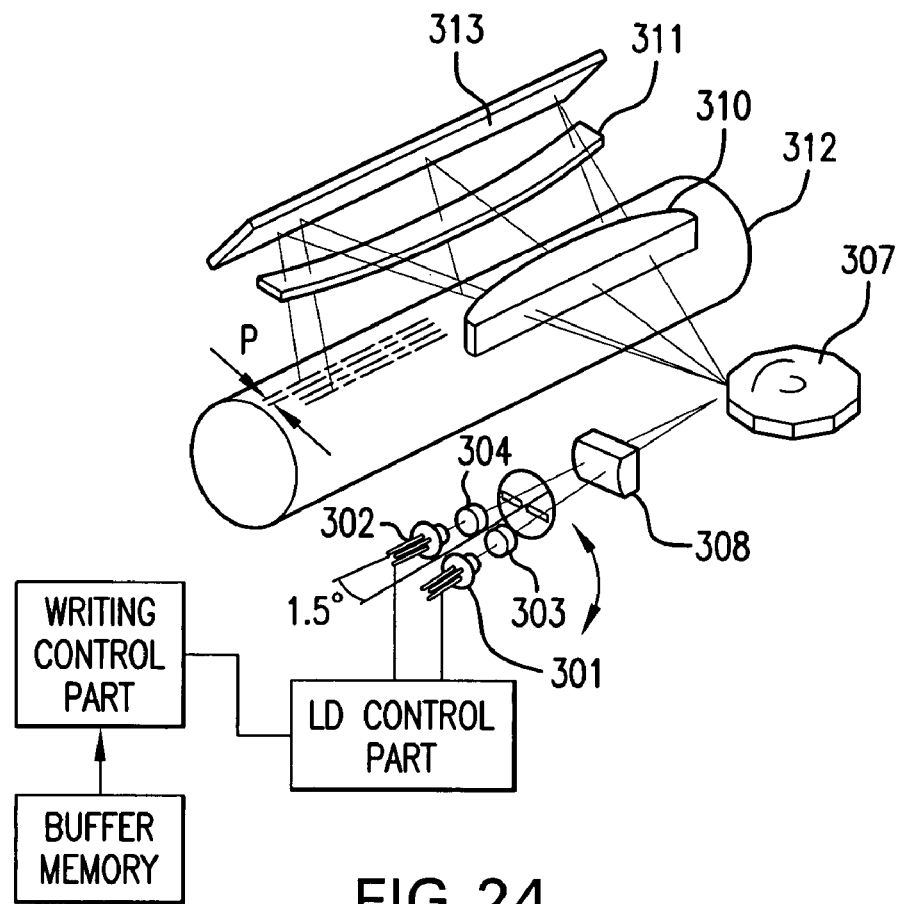
FIG. 24 is a diagram illustrating an example of a multi-beam scanning device.

FIG. 24 illustrates an example of the multi-beam scanning apparatus.

As illustrated in FIG. 24, there are used two semiconductor laser arrays (4 channels) (301, 302) with two light sources arranged monolithically at a distance (ds=25 μm) between the two light sources, and eight light sources are disposed.

As illustrated in FIG. 24, the semiconductor laser arrays 301 and 302 are disposed in such a manner that the optical axes of the lasers come into coincidence with the optical axes of collimating lenses 303 and 304, respectively.

As the semiconductor laser arrays 301 and 302 are arranged each at an outgoing angle symmetrically with the main scanning direction, the axes of the lasers outgoing from the semiconductor laser arrays 301 and 302 intersect with each other at the reflection point of the polygon mirror 307.

Plural laser beams emitted from each of the semiconductor laser arrays 301 and 302 are scanned collectively with the polygon mirror 307 through the cylindrical lens 308 and form an image on the photosensitive member 312 with the folded mirror 313 through the fθ lens 310 and the toroidal lens 311.

A buffer memory stores printing data for one line for each of the light sources, and the printing data stored in the buffer memory is read for each one mirror surface of the polygon mirror and recorded in every four lines simultaneously.

A difference in wavelengths of the plural light sources structuring the multi-beams produces a difference in the optical scanning length.

In order to correct this difference, the difference of the optical scanning length is possible to be corrected at an accuracy of the pixel clock by shifting a phase of the pixel clock, thereby alleviating a deviation in the scanning light.

Figure 25:
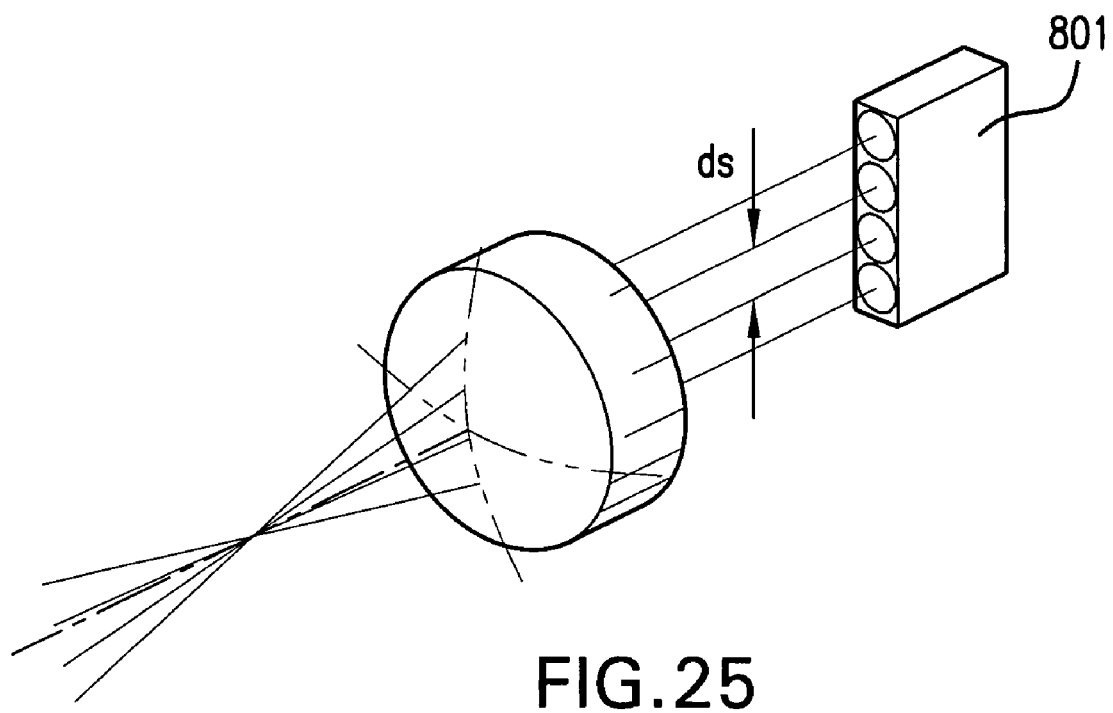
FIG. 25 is a diagram illustrating an example of a light source unit of the optical scanning device according to the present invention.

FIG. 25 illustrates an example of a light source unit for the optical scanning device.

The light source unit is structured of a laser array with four light sources disposed in the sub scanning direction when the longitudinal direction as illustrated in the drawing is defined as the sub scanning direction.

Figure 26:
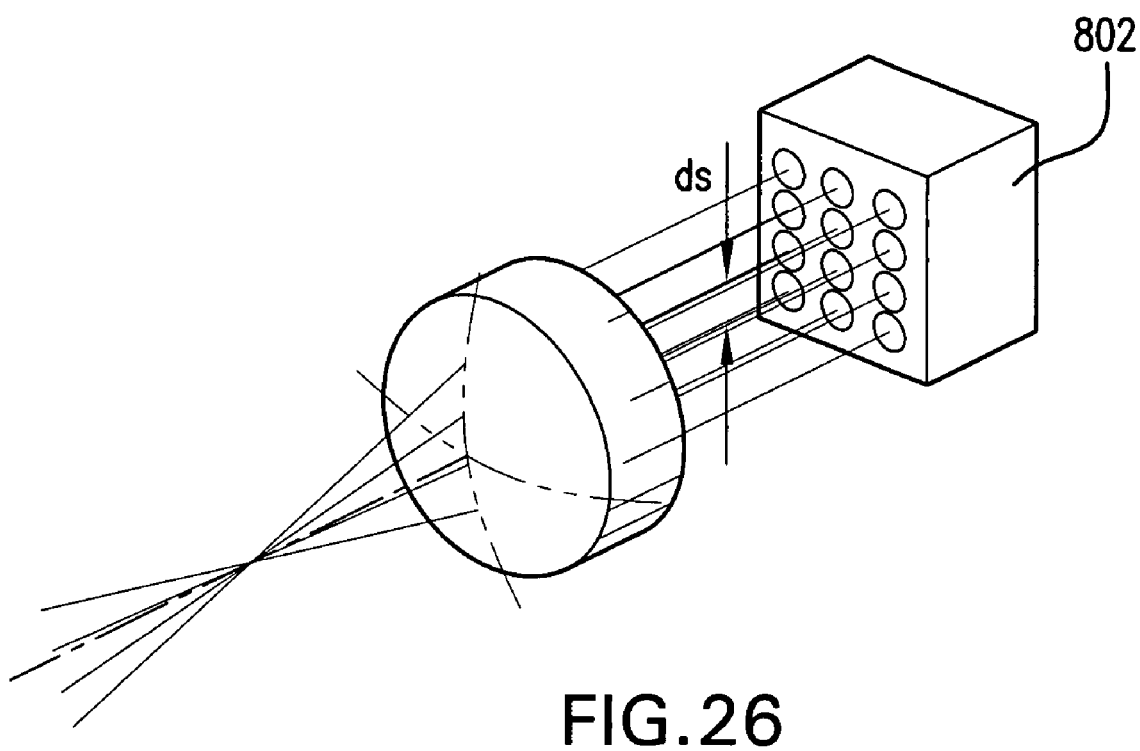
FIG. 26 is a diagram illustrating another example of a light source unit of the optical scanning device according to the present invention.

FIG. 26 illustrates another example of a light source unit for the optical scanning device.

The light source unit is structured of a vertical-cavity surface-emitting laser array with plural vertical-cavity surface-emitting lasers disposed in an array-shaped arrangement in such a manner that the light sources (vertical-cavity surface-emitting lasers) are disposed in a total number of 12 of which three light sources are disposed along the lateral direction and four light sources are disposed along the longitudinal direction.

Figure 27:
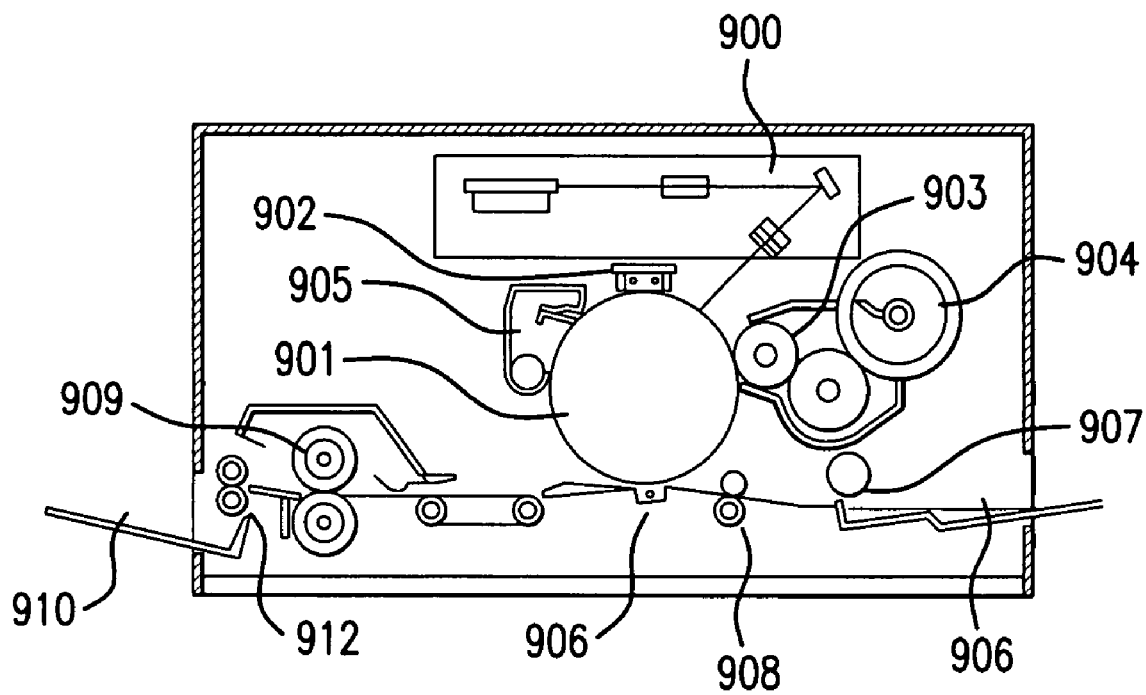
FIG. 27 is a diagram illustrating an example of the structure of an image forming apparatus according to the embodiment of the present invention.

FIG. 27 illustrates an example of an image forming apparatus according to the embodiment of the present invention.

A photosensitive drum 901 whose surface is to be scanned is provided on the periphery thereof with a charger 902 for charging the photosensitive member with high voltage, a developing roller 903 for developing an electrostatic latent image recorded on the surface of the photosensitive member 901 with the optical scanning device 900 by bonding charged toner thereonto, a toner cartridge 904 for supplying the developing roller 903 with the toner, and a cleaning casing 905 for scraping the toner remaining on the photosensitive drum 901 and storing it.

The latent images are recorded simultaneously by plural lines on every surface of the photosensitive drum 901.

A recording paper is supplied from a paper tray 906 with a paper feeding roller 907 and is fed in the sub scanning direction from a resist roller pair 908 at a timing of start of recording.

As the recording paper passes through the photosensitive drum 901, the toner is posted thereonto with a posting charger 906 and fixed thereon with a fixing roller 909 to finish printing.

Thereafter, the recording paper is discharged onto a paper discharging tray 910 with a paper discharging roller 912.

By applying the optical scanning device according to the embodiment of the present invention as the optical scanning device 900 of the image forming apparatus as described above, the deviation in position of the scanning line in the sub scanning direction is possible to be corrected at a high accuracy and an image of a high quality is obtained.

The present invention is applicable to a color image forming apparatus.

Figure 28:
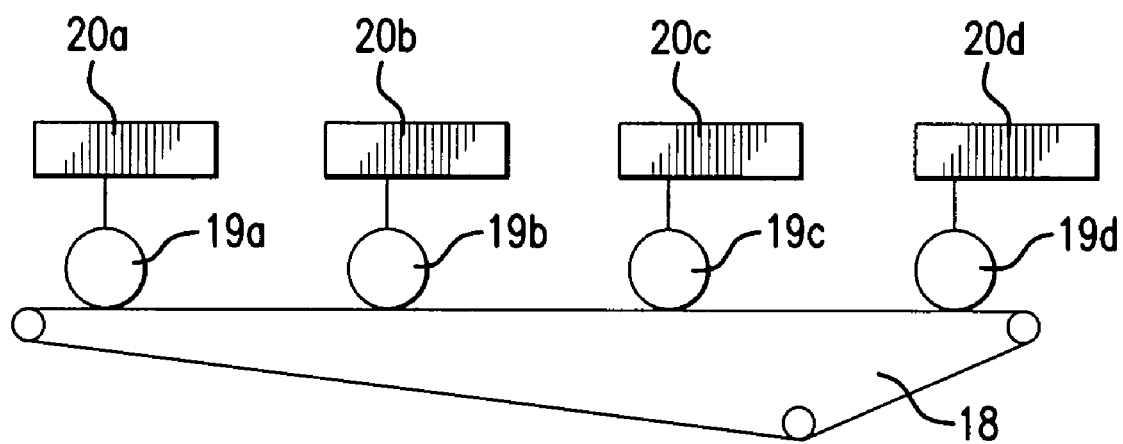
FIG. 28 is a diagram illustrating an example of a color image forming apparatus using the optical scanning device according to the embodiment of the present invention.

FIG. 28 illustrates an example in which the color image forming apparatus is mounted on a tandem color machine working as an image forming apparatus with plural photosensitive members.

The tandem color machine is provided with an individual photosensitive member for each of colors, i.e. cyan, magenta, yellow and black, and an optical scanning system is arranged to form a latent image on each surface of the photosensitive members through an individual light path. Therefore, a deviation in position of the scanning line in the sub scanning direction, which is caused to occur on each of the photosensitive member, may have their own features in many cases.

As illustrated in FIG. 28, reference numeral 18 denotes a coping belt, reference numerals 19*a*, 19*b*, 19*c* and 19*d* are photosensitive members corresponding to cyan, magenta, yellow and black colors, respectively, and reference numerals 20*a*, 20*b*, 20*c* and 20*d* are optical scanning devices for the corresponding respective colors.

By applying the optical scanning device of the embodiment of the present invention to the optical scanning devices 20*a*, 20*b*, 20*c* and 20*d*, the correction of a deviation in position of the scanning line in the sub scanning direction is possible to be achieved at a high accuracy and provide an image of a high quality.

In particular, the color image forming apparatus is possible to decrease a deviation in color due to a control over the deviation in position among the colors, thereby achieving an image of favorable color reproducibility.

Figure 30:
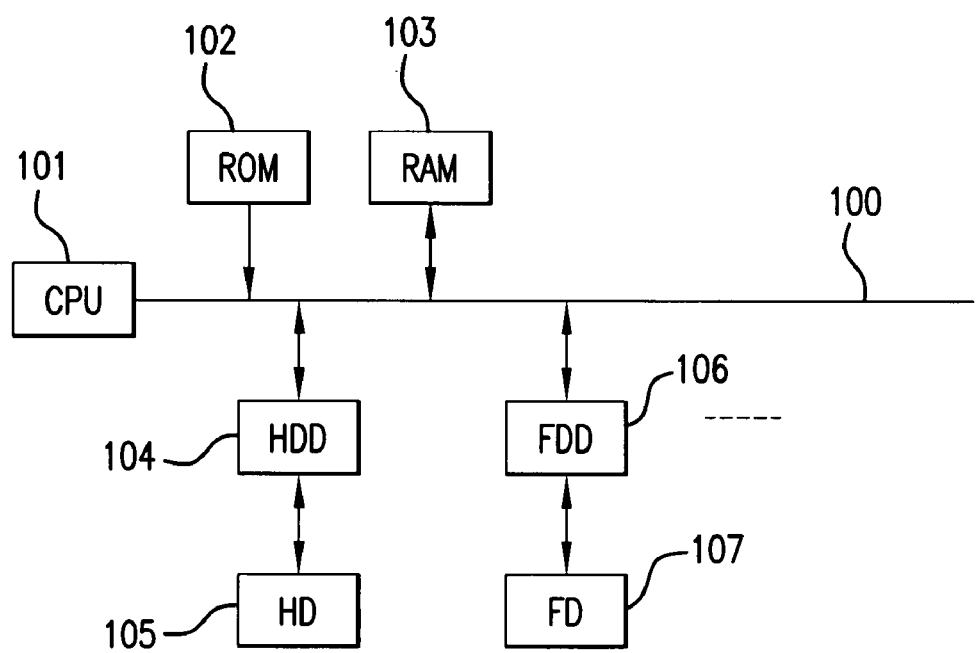
FIG. 30 is a diagram illustrating an example of the hardware configuration of the light source driving control part of the optical scanning device according to the embodiment of the present invention.

FIG. 30 illustrates an ensample of a hardware configuration of the light source driving control part 50 of the optical scanning device according to the embodiment of the present invention.

In this example, the light source driving control part 50 includes CPU 101, ROM 102, RAM 103, hard disk drive (HDD) 104, hard disk (HD) 105, flexible disk drive (FDD) 106, flexible disk (FD) 107 and so on, which are connected together through bus 100.

CPU 101 controls the device in its entirety.

ROM 102 stores control programs.

RAM 103 is used as a working area of the CPU 101.

HDD 104 operates read/write controls for HD 105 in accordance with the control by the CPU 101.

Data is written in HD 105 with HDD 104 and the written data is stored therein.

FDD 106 executes the read/write controls over data of FD 107 in response to the control of the CPU 101.

Date is written with FDD 106, and FD 107 stores the written data.

FD 107 is attached detachably.

The processing of the light source driving control part 50 in the working embodiment of the present invention is possible to be conducted by way of programs for executing a computer (for example, CPU 101).

A program for executing the processing of the light source driving control part 50 in accordance with the working embodiment of the present invention is executable by recording it on a recording medium readable with a computer, such as HDD 104, FD 107, CD-ROM, MO, DVD, and so on, and reading the recorded program from the recording medium with the computer. This program may be distributed through a network such as internet and so on.

As described in the foregoing, therefore, a deviation in position of the scanning line extending in the sub scanning direction is possible to be corrected at a high accuracy by depicting the pixels with plural light sources and controlling a light emitting time of each of the plural light sources depicting one pixel.

In addition, it is possible to correct a deviation in position of the scanning line extending in the sub scanning direction at a high accuracy by controlling an exposure area of the photosensitive member to be exposed with the plural light sources depicting one pixel.

It is possible to correct a deviation in position of the scanning line extending in the sub scanning direction at a high accuracy by controlling a surface potential of the photosensitive member with the plural light sources depicting one pixel.

It is possible to correct a deviation in position of the scanning line extending in the sub scanning direction at a high accuracy by controlling an exposure energy (or a light emitting level) of the plural light sources depicting one pixel.

It is possible to correct a deviation in position of the scanning line extending in the sub scanning position at a resolution higher than a density of pixels each of which is depicted with the plural light sources.

It is possible to perform a smooth processing for smoothing the edges of the pixels by stepwise changing the light emitting time of at least the light source disposed at one end of the plural light sources extending in the sub scanning direction and depicting one pixel upon controlling the light emitting time.

This permits the correction of a deviation in position of the scanning line in a smoother fashion.

It is also possible to perform a smooth processing for smoothing the edges of the pixels by stepwise changing the exposure energy (or the light emitting level) of at least the light source disposed at one end of the plural light sources extending in the sub scanning direction and depicting one pixel upon controlling the light emitting time.

This permits a smoother correction of the deviation in position of the scanning line.

It is further possible to perform a smoothing processing for smoothing the edges of the pixels by stepwise changing at least one of the light emitting time and the exposure energy (or light emitting level) of at least the light source disposed at one end of the plural light sources extending in the sub scanning direction and depicting one pixel upon controlling the light emitting time.

This permits a smoother correction of a deviation in position of the scanning line.

In addition, in accordance with the embodiment of the present invention, no banding (irregularities of concentrations or longitudinal lines) is caused to occur in the sub scanning direction because the position of each of the pixels for which the correction is to be started differs in each scanning line.

Also, it is possible to form an image of a high quality because the deviation in position of the scanning line extending in sub scanning position is possible to be corrected at a high accuracy.

Moreover, it is possible to form an image of a high quality with a decreased deviation in color upon forming a color image because the deviation in position of the scanning line extending in the sub scanning direction is possible to be corrected at a high accuracy.

Although the present invention has been described in terms of exemplary embodiments, it is not limited thereto.

It should be appreciated that variations and modifications may be made in the embodiments described by the skilled in the art without departing from the scope of the present invention as defined by the following claims.

What is claimed is:

1. An optical scanning device, comprising:
   n-odd (n≧2) light sources disposed at different positions at least in a sub scanning direction;
   a light source driving control part configured to control a light emitting state of the light source; and
   a sub-scanning pixel position detecting part configured to depict one pixel with m-odd (n≧m≧2) light sources of the n-odd (n≧2) light sources and to detect a deviation in position of the one pixel in a sub scanning direction,
   wherein the light source deriving control part is configured to correct the deviation in position of the one pixel in the sub scanning direction at a resolution equal to or higher than a density of the pixel, depicted with the m-odd light sources, by controlling the light emitting state of the m-odd light sources on the basis of a result of detection with the sub-scanning pixel position detecting part.

2. The optical scanning device as claimed in claim 1, wherein the light source driving control part is configured to perform the correction at a resolution of an interval between the adjacent light sources extending in the sub scanning direction, by turning on or off the light sources disposed in at least one of a top end and a bottom end of the m-odd light sources disposed along the sub scanning direction.

3. The optical scanning device as claimed in claim 1, wherein the light source driving control part is configured to perform the correction at a resolution finer than an interval between the adjacent light sources extending in the sub scanning direction by controlling a light emitting time of the light sources disposed in at least one of a top end and a bottom end of the m-odd light sources disposed along the sub scanning direction.

4. The optical scanning device as claimed in claim 1, wherein the light source driving control part is configured to perform the correction at a resolution finer than an interval between the adjacent light sources extending in the sub scanning direction by controlling an exposure area of a photosensitive member to be exposed with the light sources disposed in at least one of a top end and a bottom end of the m-odd light sources disposed along the sub scanning direction.

5. The optical scanning device as claimed in claim 1, wherein the light source driving control part is configured to perform the correction at a resolution finer than an interval between the adjacent light sources extending in the sub scanning direction by controlling a surface potential of a photosensitive member to be exposed with the light sources disposed in at least one of a top end and a bottom end of the m-odd light sources disposed along the sub scanning direction.

6. The optical scanning device as claimed in claim 1, wherein the position of the pixel which is located in a main scanning direction and for which the correction starts differs in each scanning line, and a number of the correction to be performed for each scanning line is equal to each other.

7. The optical scanning device as claimed in claim 6, wherein the position of the pixel which is located in the main scanning direction and for which the correction starts is deviated by a predetermined interval in the adjacent main scanning lines.

8. The optical scanning device as claimed in claim 6, wherein the position of the pixel which is located in the main scanning direction and for which the correction starts is set on the basis of a random number.

9. The optical scanning device as claimed in claim 6, wherein the position of the pixel which is located in the main scanning direction and for which the correction starts is set in such a manner that only the first position in each scanning line is set on the basis of a random number, and the remaining position or positions following the position in the each scanning line is or are set at a constant cycle.

10. The optical scanning device, as claimed in claim 6, wherein the position of the pixel which is located in the main scanning direction and for which the correction starts is set in such a manner that only the first position in each scanning line is set to have a different predetermined amount for each scanning line, and the remaining position or positions following the position in the each scanning line is or are set at a constant cycle.

11. The optical scanning device as claimed in claim 6, further comprising a storage part configured to store the position of the pixel which is located in the main scanning direction and for which the correction starts, wherein the correction is conducted on the basis of the position stored in advance in the storage part.

12. The optical scanning device as claimed in claim 6, further comprising a count value forming part configured to form a count value that is smaller than a total number of the pixels of the scanning line extending in the main scanning direction and does not coincide with a total number of the pixels located in the main scanning direction when multiplied with an integer, wherein the position of the pixel which is located in the main scanning direction and for which the correction starts is set at an interval of the pixels of the count value and a number of the pixel or pixels lacking from the count value at the terminal end of each scanning line is set at the initial position in the next scanning line.

13. The optical scanning device as claimed in claim 1, wherein a main scanning direction is divided by K into sections K, and the correction is conducted for every region corresponding to every section K.

14. The optical scanning device as claimed in claim 1, wherein the n-odd light sources include a semiconductor laser.

15. The optical scanning device as claimed in claim 1, wherein the n-odd light sources include a vertical-cavity surface-emitting laser.

16. An image forming apparatus, comprising an optical scanning device including:
   n-odd ($n \geq 2$) light sources disposed at different positions at least in a sub scanning direction;
   a light source driving control part configured to control a light emitting state of the light source; and
   a sub-scanning pixel position detecting part configured to depict one pixel with m-odd ($n \geq m \geq 2$) light sources of the n-odd ($n \geq 2$) light sources and to detect a deviation in position of the one pixel in a sub scanning direction,
   wherein the light source driving control part is configured to correct the deviation in position of the one pixel in the sub scanning direction at a resolution equal to or higher than a density of the pixel, depicted with the m-odd light sources, by controlling the light emitting state of the m-odd light sources on the basis of a result of detection with the sub-scanning pixel position detecting part.

17. A color image forming apparatus, comprising an optical scanning device including:
   n-odd ($n \geq 2$) light sources disposed at different positions at least in a sub scanning direction;
   a light source driving control part configured to control a light emitting state of the light source; and
   a sub-scanning pixel position detecting part configured to depict one pixel with m-odd ($n \geq m \geq 2$) light sources of the n-odd ($n \geq 2$) light sources and to detect a deviation in position of the one pixel in a sub scanning direction,
   wherein the light source driving control part is configured to correct the deviation in position of the one pixel in the sub scanning direction at a resolution equal to or higher than a density of the pixel, depicted with the m-odd light sources, by controlling the light emitting state of the m-odd light sources on the basis of a result of detection with the sub-scanning pixel position detecting part.

18. An optical scanning method for controlling scanning of n-odd ($n \geq 2$) light sources disposed at different positions at least in a sub scanning direction, the method comprising:
   depicting one pixel with m-odd ($n \geq m \geq 2$) light sources of the n-odd light sources;
   detecting a deviation in position of the one pixel located in the sub scanning direction; and
   correcting the deviation in position of the one pixel in the sub scanning direction at a resolution equal to or higher than a density of the pixel, depicted with the m-odd light sources, by controlling the light emitting state of the m-odd light sources on the basis of the deviation in position detected.

19. A non-transitory computer-readable recording medium having stored thereon a computer program for controlling scanning of n-odd ($n \geq 2$) light sources disposed at different positions at least in a sub scanning direction, the computer program executable to perform:
   depicting one pixel with m-odd ($n \geq m \geq 2$) light sources of the n-odd light sources;
   detecting a deviation in position of the one pixel located in the sub scanning direction; and
   correcting the deviation in position of the one pixel in the sub scanning direction at a resolution equal to or higher than a density of the pixel, depicted with the m-odd light sources, by controlling the light emitting state of the m-odd light sources on the basis of the deviation in position detected.

* * * * *